(12) United States Patent
Kataoka et al.

(10) Patent No.: US 9,088,170 B2
(45) Date of Patent: Jul. 21, 2015

(54) ELECTRIC POWER CONVERSION APPARATUS, POWER STORAGE SYSTEM AND POWER STORAGE METHOD

(71) Applicant: SHARP KABUSHIKI KAISHA, Osaka-shi, Osaka (JP)

(72) Inventors: Kohtaroh Kataoka, Osaka (JP); Masaru Nomura, Osaka (JP); Masatomi Harada, Osaka (JP); Hiroshi Iwata, Osaka (JP)

(73) Assignee: SHARP KABUSHIKI KAISHA, Osaka-shi, Osaka (JP)

( * ) Notice: Subject to any disclaimer, the term of this patent is extended or adjusted under 35 U.S.C. 154(b) by 173 days.

(21) Appl. No.: 14/018,767

(22) Filed: Sep. 5, 2013

(65) Prior Publication Data

US 2014/0077756 A1  Mar. 20, 2014

(30) Foreign Application Priority Data

Sep. 19, 2012  (JP) ................................. 2012-206010

(51) Int. Cl.
*H02J 7/00* (2006.01)
*H02J 7/34* (2006.01)

(52) U.S. Cl.
CPC  *H02J 7/0052* (2013.01); *H02J 7/34* (2013.01)

(58) Field of Classification Search
CPC ....................................................... H02J 3/383
USPC ......................................................... 320/107
See application file for complete search history.

(56) References Cited

U.S. PATENT DOCUMENTS

| 2004/0155527 | A1* | 8/2004 | Bryde .............................. 307/64 |
| 2004/0164618 | A1* | 8/2004 | Bryde .............................. 307/64 |
| 2007/0085514 | A1  | 4/2007 | Utsunomiya |
| 2007/0194759 | A1* | 8/2007 | Shimizu et al. ............... 320/166 |
| 2011/0148195 | A1* | 6/2011 | Lee .................................. 307/25 |
| 2013/0184884 | A1* | 7/2013 | More et al. .................... 700/291 |
| 2013/0320911 | A1* | 12/2013 | Kamiya et al. ................ 320/101 |
| 2014/0159478 | A1* | 6/2014 | Ang ............................... 307/9.1 |
| 2014/0268931 | A1* | 9/2014 | Vogel .............................. 363/40 |
| 2015/0015071 | A1* | 1/2015 | Deboy et al. .................... 307/31 |

FOREIGN PATENT DOCUMENTS

| JP | 9-135575 | 5/1997 |
| JP | 2004-120950 | 4/2004 |
| JP | 2007-104810 | 4/2007 |

* cited by examiner

*Primary Examiner* — Suchin Parihar
(74) *Attorney, Agent, or Firm* — Nixon & Vanderhye, P.C.

(57) ABSTRACT

A power storage system includes an electric power conversion apparatus, an electric power generation source, and a power storage unit. The power storage unit is configured to have a stored power voltage equal to or higher than a first control voltage to be given to a control unit, the first control voltage being necessary for electric power conversion operation by a DC-DC converter in the electric power conversion apparatus. The control unit in the electric power conversion apparatus is configured to start operating and control an operation of a first switch, when a generated power voltage of the electric power generation source reaches a second control voltage lower than the first control voltage.

20 Claims, 8 Drawing Sheets

US 9,088,170 B2

ELECTRIC POWER CONVERSION APPARATUS, POWER STORAGE SYSTEM AND POWER STORAGE METHOD

BACKGROUND OF THE INVENTION

1. Field of the Invention

The present invention relates to an electric power conversion apparatus for charging a power storage unit with a generated electric power received from an electric power generation source, a power storage system, and an power storage method.

2. Description of the Related Art

An electric power conversion apparatus that converts and obtains a generated electric power received from an electric power generation source (for example, an electric power generation source such as photovoltaics including a solar battery using natural energy) is known in the related art (refer to Japanese Unexamined Patent Application Publication No. 9-135575). An electric power conversion apparatus that charges a power storage unit (for example, a storage battery) with the obtained electric power is also known in the related art (refer to Japanese Unexamined Patent Application Publication No. 2004-120950).

In such electric power conversion apparatus, it is important to efficiently charge the power storage unit with the generated electric power received from the electric power generation source. For example, in Japanese Unexamined Patent Application Publication No. 2007-104810, an electric power conversion apparatus is disclosed that can prevent deterioration in charging efficiency.

FIGS. 8A and 8B are circuit diagrams for describing the electric power conversion apparatus A disclosed in Japanese Unexamined Patent Application Publication No. 2007-104810. FIG. 8A illustrates a circuit configuration of an entire power storage system C disclosed in Japanese Unexamined Patent Application Publication No. 2007-104810. FIG. 8B illustrates a circuit configuration of a control unit A1 and a DC-DC converter A2 of the electric power conversion apparatus A in the power storage system C.

The electric power conversion apparatus A in Japanese Unexamined Patent Application Publication No. 2007-104810 illustrated in FIGS. 8A and 8B charges a power storage unit B2 with a generated electric power Eg received from an electric power generation source B1 and includes a control unit A1, a DC-DC converter A2 including a switching element A3 and a Schottky diode A4 (refer to FIG. 8B), and a Schottky diode A5. The electric power conversion apparatus A has a configuration that converts the generated electric power Eg into a pulse-like boosted electric power, rectifies it with the Schottky diode A4 (refer to FIG. 8B) that operates as a first rectifying unit, and thus generates a first boosted electric power. In addition, the electric power conversion apparatus A maintains operation at a second boosted electric power obtained by rectifying the pulse-like boosted electric power using the Schottky diode A5 (refer to FIG. 8A) that operates as a second rectifying unit.

The power conversion apparatus A disclosed in Japanese Unexamined Patent Application Publication No. 2007-104810 has a circuit configuration in which the operation is maintained at the second boosted electric power obtained by rectifying the first boosted electric power using the Schottky diode A5 and if the power storage unit B2 is not charged, an amount of energy stored in the power storage unit B2 is prevented from being consumed. However, an electric power necessary for electric power conversion operation by the DC-DC converter A2 can be supplied only from the electric power generation source B1 side. Because of this, for example, although the electric power generation source B1 generates the electric power Eg (the generated electric power greater than the electric power necessary for the power conversion operation by the DC-DC converter A2) with which the power storage unit B2 can be charged, if the generated power voltage Vg fails to reach the voltage to be given to the control unit A1, which is necessary for the electric power conversion operation by the DC-DC converter A2, the control unit A1 may not operate the DC-DC converter A2. Thus, although the electric power Eg with which the power storage unit B2 can be charged is generated, the charging may not be performed on the power storage unit B2. This brings about a disadvantage that the generated electric power Eg becomes useless, and thus the efficiency with which the charging can be performed is decreased as much as the generated electric power Eg is useless.

SUMMARY OF THE INVENTION

According to the present invention, an electric power conversion apparatus, a power storage system, and a power storage method are provided, all of which can cause a control unit to operate a DC-DC converter and therefore perform charging on a power storage unit, thereby reducing waste of a generated electric power and performing the charging with efficiency that is improved along with reduction in waste of the generated electric power, in a state where an electric power generation source generates electric power with which the power storage unit can be charged and even if a generated power voltage fails to reach a voltage to be given to a control unit, which is necessary for electric power conversion operation by the DC-DC converter.

According to an aspect of the present invention, an electric power conversion apparatus, a power storage system, and a power storage method are provided as follows.

(1) Electric Power Conversion Apparatus

An electric power conversion apparatus for charging a power storage unit with a generated electric power received from an electric power generation source, includes a control unit that includes an electric power input unit into which an electric power is input, a DC-DC converter of which an input side is connected to the electric power generation source and of which an output side is connected to the power storage unit, an operation of the DC-DC converter being controlled by the control unit, a rectification unit that is connected between the electric power input unit of the control unit and the input side of the DC-DC converter, allows a flow of electric current from the input side of the DC-DC converter to the electric power input unit of the control unit, and disallows the flow of electric current from the electric power input unit of the control unit to the input side of the DC-DC converter, and a first switch that is connected between the electric power input unit of the control unit and the output side of the DC-DC converter, an operation of the first switch being controlled by the control unit, in which the power storage unit is configured to have a stored power voltage equal to or higher than a first control voltage to be given to the control unit, the first control voltage being necessary for electric power conversion operation by the DC-DC converter, and in which the control unit is configured to start operating and control the operation of the first switch, when a generated power voltage of the electric power generation source reaches a second control voltage lower than the first control voltage.

(2) Power Storage System

A power storage system includes the electric power conversion apparatus according to the aspect of the present invention, the electric power generation source, and the power storage unit.

(3) Power Storage Method

A power storage method of charging a power storage unit with a generated electric power received from an electric power generation source is a power storage method for an electric power conversion apparatus that controls an operation of a DC-DC converter of which an input side is connected to the generation source and of which an output side is connected to the power storage unit, using a control unit including an electric power input unit into which an electric power is input, allows a flow of electric current from the input side of the DC-DC converter to the electric power input unit of the control unit and disallows the flow of electric current from the electric power input unit of the control unit to the input side of the DC-DC converter, using a rectification unit that is connected between the electric power input unit of the control unit and the input side of the DC-DC converter, and controls an operation of a first switch using the control unit, the first switch being connected between the electric power input unit of the control unit and the output side of the DC-DC converter. The power storage method includes, when a generated power voltage of the electric power generation source reaches a second control voltage lower than a first control voltage to be given to the control unit, the first control voltage being necessary for electric power conversion operation by the DC-DC converter, supplying a stored power voltage to the control unit from the power storage unit having the stored power voltage equal to or higher than the first control voltage, by operating the control unit and controlling the operation of the first switch.

According to the aspect of the present invention, the rectification unit, which is connected between the electric power input unit of the control unit having the electric power input unit and the input side (that is, the electric power generation source) of the DC-DC converter, allows a flow of electric current from the input side (that is, the electric power generation source) of the DC-DC converter to the electric power input unit of the control unit. In addition, when the generated power voltage reaches the second control voltage lower than the first control voltage, the control unit operates itself and controls an operation of the first switch. Accordingly, when controlling an operation of the DC-DC converter of which the input side is connected to the electric power generation source and of which the output side is connected to the power storage unit, the control unit can control an operation of the first switch that is connected between the electric power input unit of the control unit and the output side (that is, the power storage unit) of the DC-DC converter. Additionally, it is possible to supply the control unit the stored power voltage from the power storage unit that is equal to or higher than the first control voltage to be given to the control unit, the first control voltage being necessary for the electric power conversion operation by the DC-DC converter. Therefore, in a state where the electric power generation source generates electric power (equal to or higher than the electric power necessary for the electric power conversion operation by the DC-DC converter) with which the power storage unit can be charged, even if the generated power voltage fails to reach the voltage necessary for the electric power conversion operation by the DC-DC converter, the DC-DC converter can be operated. Therefore, since the power storage unit can be charged, it is possible to reduce waste of the generated electric power and perform the charging with efficiency that is improved that much. Besides, by disallowing the flow of electric current from the electric power input unit of the control unit to the input side (that is, the electric power generation source) of the DC-DC converter, the rectification unit can block an electric current path along which the electric power is not converted by the DC-DC converter between the electric power input unit of the control unit and the input side (that is, the electric power generation source) of the DC-DC converter.

According to the aspect, when the generated power voltage reaches the second control voltage, the control unit may cause the first switch to be in an ON state and allow the flow of electric current between the electric power input unit of the control unit and the output side of the DC-DC converter.

According to this specific matter, when the generated power voltage reaches the second control voltage, the control unit causes the first switch to be in the ON state and allows the flow of electric current between the electric power input unit of the control unit and the output side (that is, power storage unit side) of the DC-DC converter. Thus, the first control voltage to be given to the control unit, which is necessary for the electric power conversion operation by the DC-DC converter, can be surely supplied from the power storage unit to the control unit. It is possible to operate the DC-DC converter with stability that is improved that much.

The generated electric power may fall below the electric power necessary for the electric power conversion operation of the DC-DC converter, depending on the generation state of the electric power generation source. For example, if the electric power generation source is a solar battery, when charging the power storage unit with the electric power received from the electric power generation source, sufficient electric power might not be generated because stable exposure to sunlight is not always obtained. There is a disadvantage that when operating continuously the DC-DC converter with the generated electric power falling below the electric power necessary for the electric power conversion operation by the DC-DC converter, the stored electric power of the power storage unit, that is, an amount of energy (an amount of electric power) accumulated in the power storage unit may be rather consumed.

Then, according to the aspect, when it is detected that the generated electric power falls below an electric power necessary for the electric power conversion operation by the DC-DC converter while the DC-DC converter is in operation, the control unit may cause the first switch to be in an OFF state.

According to this specific matter, when it is detected that the generated electric power falls below the electric power necessary for the electric power conversion operation by the DC-DC converter while the DC-DC converter is in operation, the control unit causes the first switch to be in the OFF state. Thus, it is possible to prevent the stored electric power of the power storage unit from being consumed when the generated electric power falls below the electric power necessary for the electric power conversion operation by the DC-DC converter.

According to the aspect, the DC-DC converter may be a step-up DC-DC converter that is configured to step up a voltage on the input side thereof, and when it is detected that the generated power voltage of the electric power generation source is lower than the stored power voltage of the power storage unit, the control unit may step up the generated power voltage.

According to this specific matter, when it is detected that the generated power voltage is lower than the stored power voltage, the control unit steps up the generated power voltage using the step-up DC-DC converter. Thus, it is possible to surely charge the power storage unit with the generated electric power received from the electric power generation source although the generated power voltage of the electric power generation source is lower than the stored power voltage of the power storage unit.

According to the aspect, the DC-DC converter may be a step-up and step-down DC-DC converter that is configured to step up and step down a voltage on the input side thereof, and when it is detected that the generated power voltage of the electric power generation source is lower than the stored power voltage of the power storage unit, the control unit may step up the generated power voltage, and when it is detected that the generated power voltage of the electric power generation source is higher than the stored power voltage of the power storage unit, the control unit may step down the generated power voltage.

According to this specific matter, when it is detected that the generated power voltage is lower than the stored power voltage, the control unit steps up the generated power voltage using the step-up and step-down DC-DC converter. Thus, the control unit can surely charge the power storage unit with the generated electric power received from the electric power generation source although the generated power voltage of the electric power generation source is lower than the stored power voltage of the power storage unit. Also, when it is detected that the generated power voltage is higher than the stored power voltage, the control unit steps down the generated power voltage using the step-up and step-down DC-DC converter. Thus, the control unit can surely charge the power storage unit with the generated electric power received from the electric power generation source although the generated power voltage of the electric power generation source is higher than the stored power voltage of the power storage unit.

According to the aspect, the rectification unit may further include a rectification element.

According to this specific matter, with a simplified configuration, it is possible to block the electric current path along which the electric power is not converted by the DC-DC converter between the electric power input unit of the control unit and the electric power generation source.

When the generated power voltage of the electric power generation source is higher than the stored power voltage of the power storage unit, there occurs the electric current path from the electric power generation source through the electric power input unit of the control unit to the power storage unit, along which the electric power conversion by the DC-DC converter is not performed. This decreases the electric power conversion efficiency.

Then, according to the aspect, the rectification unit may further include a second switch that is connected in series to the rectification element, an operation of the second switch being controlled by the control unit and the second switch being in an ON state when the control unit is not in operation.

According to this specific matter, when the control unit is not in operation, the second switch is in the ON state. Thus, although the control unit is not in operation, the flow of electric current can be allowed between the rectification element and the electric power input unit of the control unit. This makes it possible to supply the second control voltage from the electric power generation source to the electric power input unit of the control unit and thus to operate the control unit. Even if the generated power voltage of the electric power generation source is higher than the stored power voltage of the power storage unit, through the use of the second switch, it is possible to block the electric current path from the electric power generation source through the electric power input unit of the control unit to the power storage unit, along which the electric power conversion by the DC-DC converter is not performed. This can prevent a decrease in the electric power conversion efficiency.

As described above, according to the aspect of the present invention, in a state where the electric power generation source generates the generated electric power with which the power storage unit can be charged and even if the generated power voltage fails to reach the voltage necessary for the electric power conversion operation by the DC-DC converter, the DC-DC converter can be operated by the control unit. Therefore, since the power storage unit can be charged, it is possible to reduce waste of the generated electric power and perform the charging with efficiency that is improved that much.

BRIEF DESCRIPTION OF THE DRAWINGS

FIG. 8A is the diagram illustrating a circuit configuration of an entire power storage system disclosed in Japanese Unexamined Patent Application Publication No. 2007-104810, and FIG. 8B is the diagram illustrating a circuit configuration of a control unit and a DC-DC converter of the electric power conversion apparatus in the power storage system.

DESCRIPTION OF THE PREFERRED EMBODIMENTS

Embodiments according to the present invention are described below referring to the accompanying drawings. In addition, the embodiments that follow are examples of realization of the present invention and do not impose any limit on a technological scope of the present invention.

Figure 1:
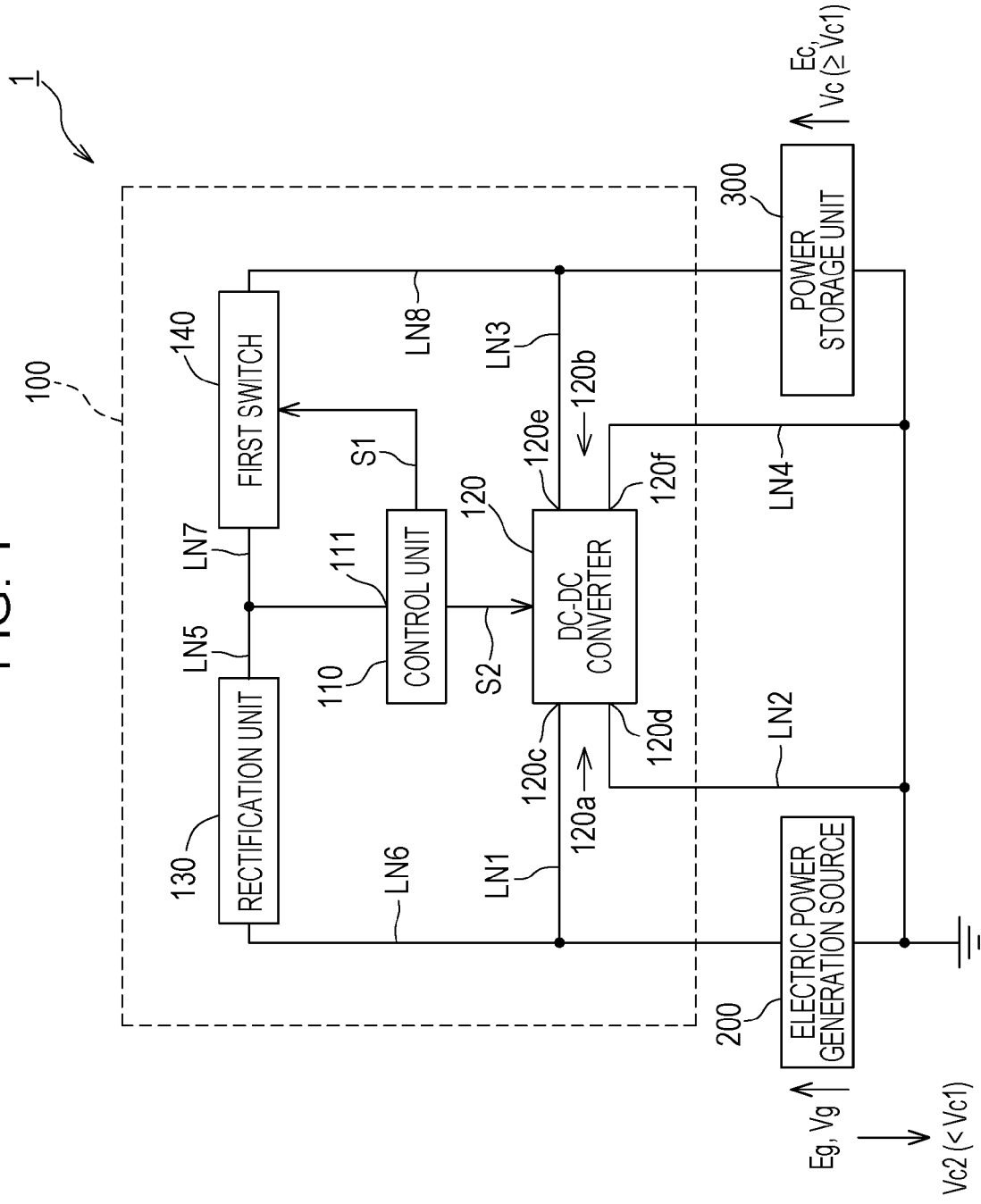
FIG. 1 is a circuit diagram schematically illustrating a circuit configuration of a power storage system including an electric power conversion apparatus.

FIG. 1 is a circuit diagram schematically illustrating a circuit configuration of a power storage system 1 including an electric power conversion apparatus 100.

The electric power conversion apparatus 100 illustrated in FIG. 1 charges a power storage unit 300 with a generated electric power Eg from an electric power generation source 200. The electric power conversion apparatus 100 includes a control unit 110, a DC-DC converter (specifically, a chopper circuit) 120, a rectification unit 130 and a first switch 140. Moreover, the electric power generation source 200 includes whatever electric power generation sources output direct current. A solar battery and a combination of an aerogenerator and a rectifier can be enumerated as examples of this. Here, the electric power generation source 200 is assumed to be the solar battery. Furthermore, the power storage unit 300 may include whatever can be used as a battery that stores electricity by performing charging. A storage battery, for example, a rechargeable battery using lead, and a capacitor type device can be enumerated as examples of this. Here, the power storage unit 300 is assumed to be the storage battery. The electric power generation source 200 may include multiple power generation elements. In this case, the multiple power generation elements can be connected in series and/or in parallel to one another. Furthermore, the power storage unit 300 may include multiple power storage elements. In this case, the multiple power storage elements can be connected in series and/or in parallel to one another.

The control unit 110 has an electric power input unit 111 and has a configuration in which electric power is input into the electric power input unit 111. An output control system of the control unit 110 is connected to the first switch 140 through a first switch control signal line S1. The control unit 110 performs ON/OFF control on the first switch 140 by controlling an operation of the first switch 140. Furthermore, the output control system of the control unit 110 is connected to the DC-DC converter 120 through a gate drive signal line S2. The control unit 110 performs control on electric power conversion that converts DC power on an input side 120a into DC power on an output side 120b by controlling an operation of the DC-DC converter 120.

In the DC-DC converter 120, one terminal 120c on the input side 120a is connected to a positive side of the electric power generation source 200 through a power line LN1, and the other terminal 120d on the input side 120a is connected to a negative side (ground) of the electric power generation source 200 over a power line LN2. Furthermore, one terminal 120e on the output side 120b of the DC-DC converter 120 is connected to a positive side of the power storage unit 300 through a power line LN3, and the other terminal 120f on the output side 120b of the DC-DC converter 120 is connected to a negative side (ground) of the power storage unit 300 through a power line LN4. An operation of the DC-DC converter 120 is controlled with a gate drive signal from the control unit 110 through the gate drive signal line S2.

The rectification unit 130 is connected between the electric power input unit 111 of the control unit 110 and one terminal 120c (that is, the positive side of the electric power generation source 200) on the input side 120a of the DC-DC converter 120 through power lines LN5 and LN6. The rectification unit 130 allows a flow of electric current from the one terminal 120c (that is, the positive side of the electric power generation source 200) on the input side 120a of the DC-DC converter 120 to the electric power input unit 111 of the control unit 110 and disallows the flow of electric current from the electric power input unit 111 of the control unit 110 to the one terminal 120c (that is, the positive side of the electric power generation source 200) on the input side 120a of the DC-DC converter 120.

The first switch 140 is connected between the electric power input unit 111 of the control unit 110 and the one terminal 120e (that is, a positive side of the power storage unit 300) on the output side 120b of the DC-DC converter 120 through power lines LN7 and LN8. An operation of the first switch 140 is controlled with a first switch control signal from the control unit 110 through the first switch control signal line S1. In addition, the first switch 140 may be configured in such a manner that it is in an OFF state when the control unit 110 is not in operation or may be configured in such a manner that is in an ON state when the control unit 110 is not in operation.

The power storage unit 300 may be configured to have a stored power voltage Vc equal to or higher than a first control voltage Vc1 that is determined in advance as being given to the control unit 110 (Vc≥Vc1). The first control voltage Vc1 is a voltage necessary for electric power conversion operation by the DC-DC converter 120.

Then, when a generated power voltage Vg of the electric power generation source 200 reaches a predetermined second control voltage Vc2 lower than a first control voltage Vc1 (Vc2<Vc1), the control unit 110 operates itself and transmits the first switch control signal to the first switch 140 through the first switch control signal line S1. In this manner, the control unit 110 controls an operation of the first switch 140.

First Embodiment

Next, a detailed circuit configuration of the electric power conversion apparatus 100 according to a first embodiment illustrated in FIG. 1 is described below referring FIG. 2 and FIG. 3.

Here, the electric power conversion apparatus 100 (100A) according to the first embodiment constitutes a step-up DC-DC converter that steps up an output of the electric power generation source 200 and performs charging on the power storage unit 300 with the stepped-up output of the electric power generation source 200.

Figure 2:
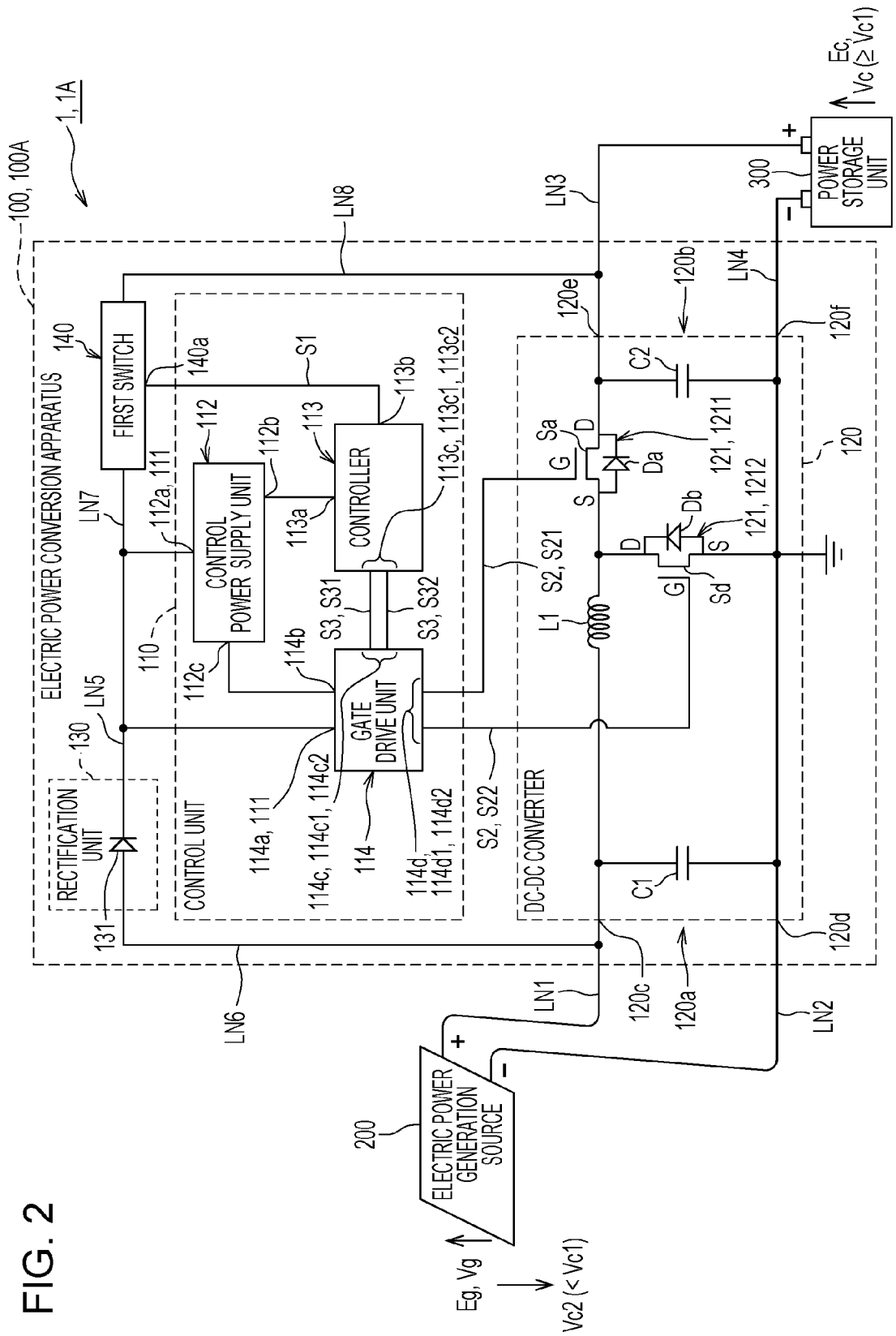
FIG. 2 is a circuit diagram schematically illustrating a detailed circuit configuration of an electric power conversion apparatus according to a first embodiment.

FIG. 2 is a circuit diagram schematically illustrating the detailed circuit configuration of the electric power conversion apparatus 100 (100A) according to the first embodiment.

The control unit 110, as illustrated in FIG. 2, includes a control power supply unit 112, a controller 113, and a gate drive unit (specifically a gate driver) 114.

The control power supply unit 112 includes a control power input unit 112a (the electric power input unit 111) to which electric power is supplied from the rectification unit 130 or the first switch 140, a first power output unit 112b supplies electric power to the controller 113, and a second power output unit 112c that supplies electric power to a gate drive unit 114.

The first power output unit 112b of the control power supply unit 112 is connected to a controller power input unit 113a of the controller 113. The control power supply unit 112 supplies electric power from the control power input unit 112a to the controller 113. Furthermore, the second power output unit 112c of the control power supply unit 112 is connected to a second-gate-drive-unit power input unit 114b of the gate drive unit 114. The control power supply unit 112 supplies electric power from the control power input unit 112a to the gate drive unit 114. Then, the control power supply unit 112 constitutes a control voltage generation unit that generates a stable control voltage. The control power supply unit 112 here includes a constant voltage circuit such as a regulator.

The controller 113 includes a processing unit (CPU) such as a microcomputer, and has the controller power input unit 113a to which electric power is supplied from the first power output unit 112b of the control power supply unit 112, a first switch control signal output unit 113b that outputs the first switch control signal, and a gate control signal output unit 113c that outputs the gate drive signal.

The controller 113 transmits the first switch control signal from the first switch control signal output unit 113b to a first switch control signal input unit 140a of the first switch 140 through the first switch control signal line S1. One end of the first switch control signal line S1 is connected to the first switch control signal output unit 113b, and the other end thereof is connected to the first switch control signal input unit 140a of the first switch 140.

Then, the controller 113 is configured to start operating when the second control voltage Vc2 lower than the first control voltage Vc1 necessary for the electric power conversion operation by the DC-DC converter 120 is supplied from the control power supply unit 112 (that is, operating only with the second control voltage Vc2 being supplied). Accordingly, the controller 113 transmits the first switch control signal from the first switch control signal output unit 113b to the first switch control signal input unit 140a of the first switch 140 through the first switch control signal line S1 and controls an operation of the first switch 140. Thus, the controller 113 can perform ON/OFF control on the first switch 140.

Furthermore, one end of each of gate control signal lines S3 (S31 and S32) is connected to the corresponding one of gate control signal output units 113c (here, the two gate control signal output units 113c1 and 113c2) of which the number corresponds to the number of switching elements 121 (here, two) in the DC-DC converter 120 and the other end of each of the gate control signal lines S3 (S31 and S32) is connected to the corresponding one of gate control signal input units 114c (here, the two gate control signal input units 114c1 and 114c2) of the gate drive unit 114. The controller 113 transmits a gate control signal (specifically, a gate PWM control signal) from the gate control signal output units 113c (113c1 and 113c2) to the gate control signal input units 114c (114c1 and 114c2) of the gate drive unit 114 through the gate control signal lines S3 (S31 and S32).

Then, when the second control voltage Vc2 lower than the first control voltage Vc1 necessary for the electric power conversion operation by the DC-DC converter 120 is supplied from the control power supply unit 112 (that is, only with the second control voltage Vc2 being supplied), the controller 113 can transmit the gate control signal from the gate control signal output units 113c (113c1 and 113c2) to the gate control signal input units 114c (114c1 and 114c2) of the gate drive unit 114 through the gate control signal lines S3 (S31 and S32).

The gate drive unit 114 has a first gate-drive-unit power input unit 114a (the electric power input unit 111) to which electric power is supplied from the rectification unit 130 or the first switch 140, the second-gate-drive-unit power input unit 114b to which electric power is supplied from the second power output unit 112c of the control power supply unit 112, the gate control signal input units 114c (114c1 and 114c2) to which the gate drive signal is supplied from the gate control signal output units 113c (113c1 and 113c2) of the controller 113, and a gate drive signal output units 114d (here, two gate drive signal output units 114d1 and 114d2) that output the gate drive signal.

One end of each of the gate drive signal lines S2 (S21 and S22) is connected to the corresponding one of gate drive signal output units 114d (114d1 and 114d2) of which the number corresponds to the number (here, 2) of the switching elements 121 of the DC-DC converter 120 and the other end of each of the gate drive signal lines S2 (S21 and S22) is connected to the corresponding gate (G) of the switching elements 121 (1211 and 1212) of the DC-DC converter 120. The gate drive unit 114 transmits the gate drive signal from the gate drive signal output units 114d (114d1 and 114d2) to a gate (G) of the switching elements 121 (1211 and 1212) of the DC-DC converter 120 through the gate drive signal lines S2 (S21 and S22).

Then, the first control voltage Vc1 necessary for the electric power conversion operation by the DC-DC converter 120 is supplied from the first gate-drive-unit power input unit 114a and the control power input unit 112a (the electric power input unit 111), and the gate drive unit 114 transmits the gate drive signal from the gate drive signal output units 114d (114d1 and 114d2) to the gate (G) of the switching elements 121 (1211 and 1212) of the DC-DC converter 120 through the gate drive signal lines S2 (S21 and S22). By doing this, the gate drive unit 114 controls an operation of the DC-DC converter 120 and thus performs the ON/OFF control. Consequently, the gate drive unit 114 can perform the power conversion control.

According to the present first embodiment, the DC-DC converter 120 constitutes the step-up DC-DC converter (specifically, the step-up chopper circuit) that steps up a voltage (the generated power voltage Vg) on the input side 120a into a voltage (the stored power voltage Vc) on the output side 120b and outputs the stepped-up voltage to the output side 120b. The DC-DC converter 120 further includes a monitoring unit that monitors (detects) the generated power voltage Vg of the electric power generation source 200 and the stored power voltage Vc of the power storage unit 300. When the monitoring unit detects that the generated power voltage Vg of the electric power generation source 200 is lower than the stored power voltage Vc of the power storage unit 300, the control unit 110 steps up the generated power voltage Vg.

More specifically, the controller 113 here monitors electric current on the input side 120a of the DC-DC converter 120 (for example, an output voltage of an electric current sensor provided on the input side 120a of the DC-DC converter 120, which is not illustrated) and the voltage on the input side 120a of the DC-DC converter 120 and performs voltage conversion. The controller 113 converts the voltage with a resistance division, removes noise with a low-pass filter, and performs amplification with an amplifier, whenever necessary. Thus, the controller 113 can provide an input to an ADC terminal in order to use a function of an analog-to-digital converter (ADC) in the microcomputer. With such a configuration, the output electric current and the output voltage of the electric power generation source 200 can be monitored. Furthermore, a power source voltage (Vcc) can be monitored as a voltage on the output side 120b of the DC-DC converter 120 whenever necessary. With such a configuration, the controller 113 monitors overcharging of the power storage unit 300. When detecting an occurrence of the overcharging, the controller 113 stops a converting operation (the electric power conversion operation) in the DC-DC converter 120.

Then, the controller 113 provides a PWM control signal in such a manner that an output electric power (here solar output electric power) to be obtained by multiplying the monitored output electric current from the electric power generation source 200 by the monitored output voltage from the electric power generation source 200 is maximized with an arithmetic operation in the microcomputer. Thus, the controller 113 can perform what is called a maximum power point tracking (MPPT) control. With such control mechanism, the controller 113 can perform power generation with high efficiency.

Moreover, according to the present first embodiment, in order to perform the MPPT control, the voltage and the electric current on the input side 120a of the DC-DC converter 120 are monitored, and whenever necessary, the power source voltage (Vcc) is monitored as the voltage on the output side 120b of the DC-DC converter 120. However, for example, the MPPT control may be performed in such a manner as to maximize the output electric power from the DC-DC converter 120, while monitoring the output electric current and the output voltage of the DC-DC converter 120 with the electric current sensor provided on the output side 120b of the DC-DC converter 120. In this case, the control can be performed in such a manner as to maximize charging electric power to be obtained by subtracting the electric power necessary for the electric power conversion operation by the DC-DC converter 120 and a converting loss (a switching loss) occurring at the time of the electric power conversion operation from the generated electric power Eg of the electric power generation source 200. This makes it possible to perform the charging on the power storage unit 300 with higher efficiency in power conversion efficiency. Herein, a sensor that outputs an output voltage using a Hall effect element and a sensor that amplifies a voltage decreased due to resistance of the electric current sensor and outputs the amplified output voltage can be examples of the electric current sensors. Furthermore, the monitoring of the voltage on the input side 120a of the DC-DC converter 120 may be omitted.

According to the present first embodiment, the DC-DC converter 120 includes one or more (here, two) of the switching elements 121 (1211 and 1212) and an inductor L1 (specifically, a choke coil).

The two switching elements 1211 and 1212 are made from semiconductor switches Sa and Sb and diodes Da and Db, respectively. The semiconductor switches Sa and Sb are semiconductor devices in each of which ON/OFF control to enable electric current to flow only in one direction is possible. The diodes Da and Db are connected in parallel to the semiconductor switches Sa and Sb in such a manner that electric current is enabled to flow in the direction opposite to the direction in which the semiconductor switches Sa and Sb can enable the electric current to flow.

As examples of the switching elements 121 (1211 and 1212), there can be a semiconductor element such as an insulated gate bipolar transistor (IGBT) and a gate turn-off thyristor (GTO) in which diodes are connected to each other in parallel in the direction opposite to the direction in which electric current is enabled to flow to a semiconductor switch and a semiconductor element such as a metal-oxide-semiconductor field-effect transistor (MOSFET) in which a structural parasitic diode (a body diode) of a semiconductor is present. This is true for switching elements 121 (1213 and 1214) according to a second embodiment, which is described below.

Among the two switching elements 1211 and 1212, a drain (D) of one switching element 1211 is connected to the power line LN3 and a source (S) thereof is connected to the power line LN1 through the inductor L1. A drain (D) of the other switching element 1212 is connected to the source (S) of the one switching element 1211 and a source (S) thereof is connected to the power lines LN2 and LN4 (ground).

Whenever necessary, the DC-DC converter 120 may further include a first capacitor C1 (specifically, a smoothing capacitor) that is connected in parallel with respect to the switching element 1212 between the power line LN1 and the power line LN2 on the input side 120a and a second capacitor C2 (specifically, the smoothing capacitor) that is connected in parallel with respect to the switching element 1212 between the power line LN3 and the power line LN4 on the output side 120b.

Specifically, in the DC-DC converter 120, one end of the inductor L1 is connected to a positive side of the electric power generation source 200, and the other end of the inductor L1 is connected to a source (S) of the switching element 1211 and a drain (D) of the switching element 1212. Whenever necessary, one end of the first capacitor C1 is connected to a positive side of the electric power generation source 200 and the other end of the first capacitor C1 is connected to ground (is grounded). Furthermore, a source (S) of the switching element 1212 is connected to ground (is grounded), the drain (D) of the switching element 1211 is connected to a positive side of the power storage unit 300. Whenever necessary, one end of the second capacitor C2 is connected to a positive side of the power storage unit 300 and the other end the second capacitor C2 is connected to ground (is grounded). In addition, instead of the switching element 1211, a diode may be provided in which a source (S) is set as an anode and a drain (D) is set as a cathode, but preferably, synchronous rectification that turns on the switching element 1211 complementarily is performed on the switching element 1212 by the switching element 1211. By doing this, a diode loss can be suppressed, and a voltage step-up operation can be performed with high efficiency.

Then, when the gate drive unit 114 receives the gate control signal (specifically a gate control PWM signal) from the controller 113, the gate drive signal is transmitted from the gate drive unit 114 receiving the gate control signal to the gate (G). Operations of the switching elements 1211 and 1212 are controlled (specifically, PWM-controlled) by this transmission of the gate drive signal.

The rectification unit 130 includes a diode 131 that functions as a rectification element. A cathode of the diode 131 is connected to the control power input unit 112a of the control power supply unit 112 and the first gate-drive-unit power input unit 114a of the gate drive unit 114 through a power line LN5, and an anode of the diode 131 is connected to one terminal 120c (that is, the positive side of the electric power generation source 200) on the input side 120a of the DC-DC converter 120 through a power line LN6.

One end of the first switch 140 is connected to the control power input unit 112a of the control power supply unit 112 and the first gate-drive-unit power input unit 114a of the gate drive unit 114 through a power line LN7, and the other end is connected to one terminal 120e (that is, the positive side of the power storage unit 300) on the output side 120b of the DC-DC converter 120 through a power line LN8.

The first switch 140 may include whatever can be ON/OFF-controlled with the first switch control signal that is input into the first switch control signal input unit 140a. The first switch 140 herein is configured to be turned ON if the first switch control signal from the controller 113 is "HIGH" and turned off if the first switch control signal is "LOW" when a voltage is applied to the output side 120b of the DC-DC converter 120. Furthermore, the first switch 140 herein is assumed to be a combination of a positive channel metal oxide semiconductor (PMOS) transistor SW1 (refer to FIG. 3) and a negative channel metal oxide semiconductor (NMOS) transistor SW2 (refer to FIG. 3).

Figure 3:
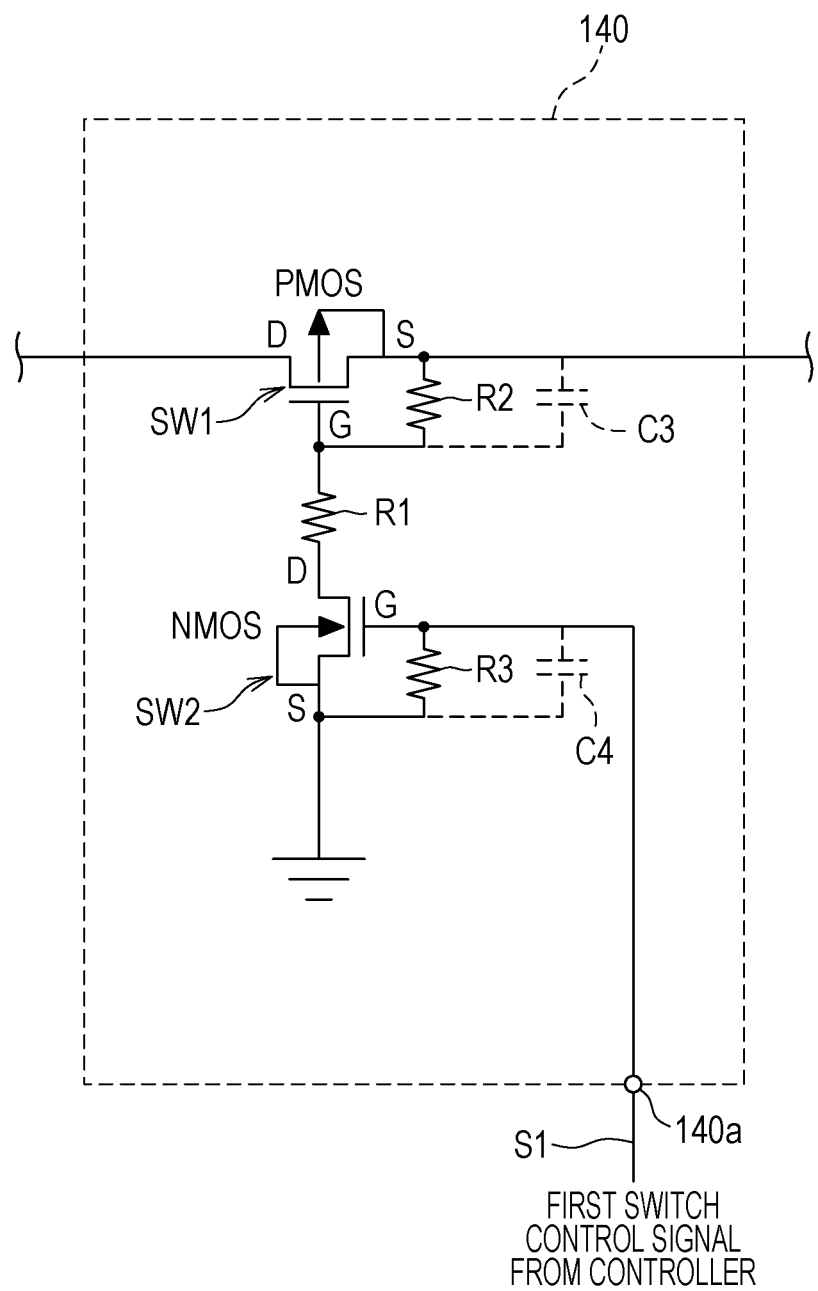
FIG. 3 is a circuit diagram illustrating details of a first switch in the electric power conversion apparatus according to the first embodiment.

FIG. 3 is a circuit diagram illustrating details of the first switch 140 in the electric power conversion apparatus 100 (100A) according to the first embodiment.

As illustrating in FIG. 3, the PMOS transistor SW1 is a switching element of which a source (S) side is the output side 120b (refer to FIG. 2) of the DC-DC converter 120 and of which a drain (D) side is the control power input unit 112a (refer to FIG. 2) of the control power supply unit 112.

A drain (D) of the NMOS transistor SW2 is connected to a gate (G) of the PMOS transistor SW1 through a resistor R1, a source (S) of the NMOS transistor SW2 is connected to ground (is grounded), and the gate (G) of the NMOS transistor SW2 connected to the first switch control signal input unit 140a is connected to the first switch control signal output unit 113b of the controller 113 (refer to FIG. 2) through the first switch control signal line S1. With such configuration, the first switch control signal is transmitted from the first switch control signal output unit 113b of the controller 113 to the gate (G) of the NMOS transistor SW2 in the first switch 140 and thus the NMOS transistor SW2 is ON/OFF-controlled. By doing this, the PMOS transistor SW1 is ON/OFF-controlled and is in an OFF state at a time when the control unit 110 is not in operation. Specifically, in the first switch 140, when the first switch control signal "HIGH" is given to the NMOS transistor SW2 and thus a gate threshold of the PMOS transistor SW1 is exceeded, the PMOS transistor SW1 conducts electricity. In contrast, when the first switch control signal "LOW" is given to the NMOS transistor SW2, the PMOS transistor SW1 does not conduct electricity.

In addition, from the perspective of preventing a gate electric potential from being unstable, that is, from the perspective of making the PMOS transistor SW1 and the NMOS transistor SW2 be in an OFF state at a time when the controller 113 is not in operation, it is preferable that the resistors R2 and R3 be connected between the gate (G) and the source (S) of the PMOS transistor SW1 and between the gate (G) and the source (S) of the NMOS transistor SW2, respectively. Furthermore, in the perspective of preventing the PMOS transistor SW1 and the NMOS transistor SW2 from being erroneously turned ON at a time when electric potentials of the sources (S) of the PMOS transistor SW1 and the NMOS transistor SW2 abruptly change, capacitors C3 and C4 (refer to dashed lines in FIG. 3) may be connected between the gate (G) and source (S) of the PMOS transistor SW1 and between the gate (G) and source (S) of the NMOS transistor SW2, respectively.

Figure 8A:
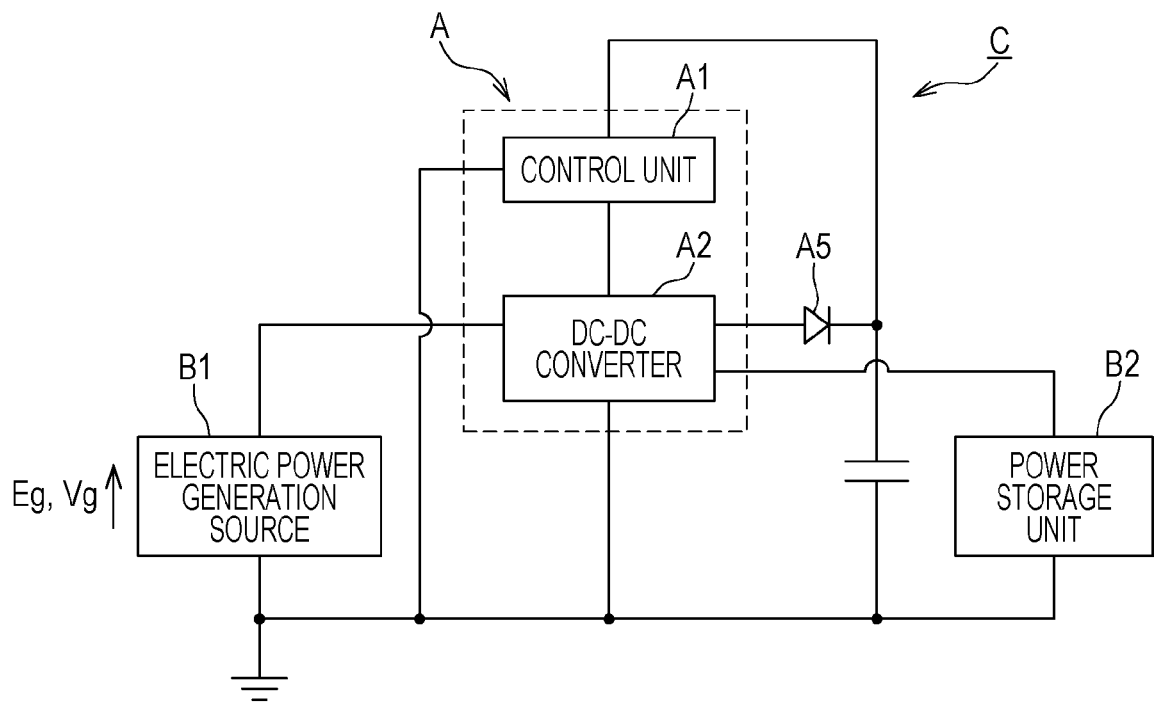
FIGS. 8A and 8B are circuit diagrams for describing an electric power conversion apparatus disclosed in Japanese Unexamined Patent Application Publication No. 2007-104810.
Figure 8B:
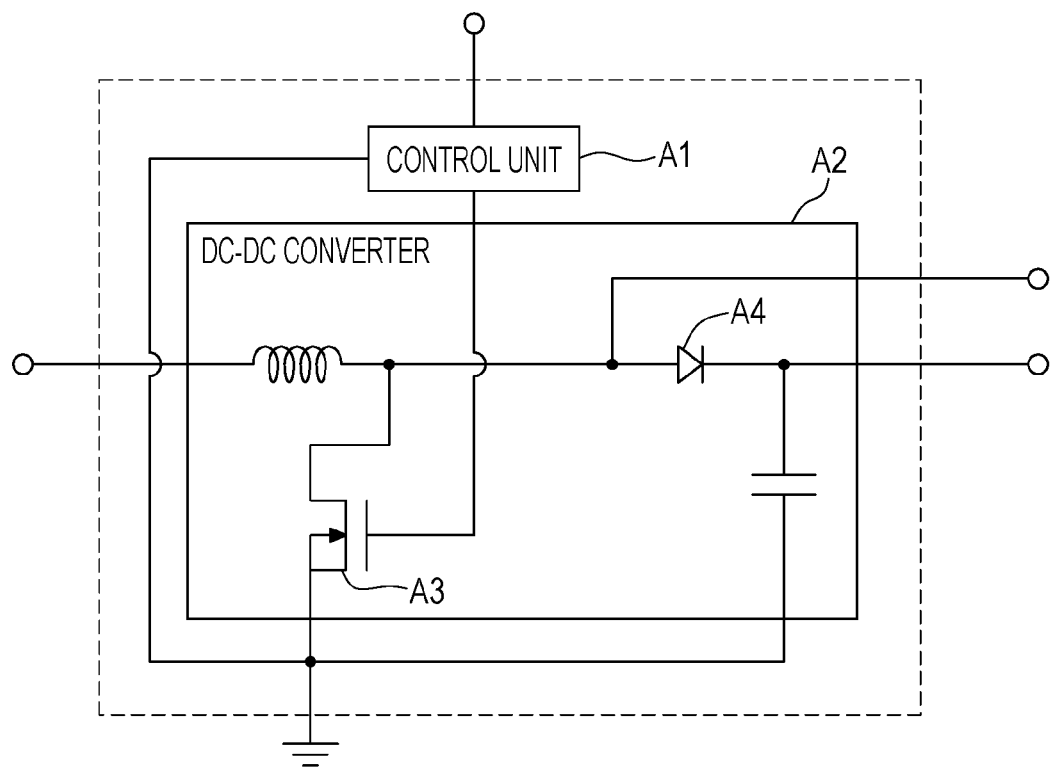

As illustrated in FIGS. 8A and 8B, an electric power conversion apparatus A disclosed in Japanese Unexamined Patent Application Publication No. 2007-104810 has a circuit configuration in which an electric power necessary for the electric power conversion operation by a DC-DC-converter A2 can be provided only from an electric power generation source B1. Because of this, for example, although the electric power generation source B1 generates the electric power Eg (the generated electric power greater than the electric power necessary for the electric power conversion operation by the DC-DC converter A2) with which a power storage unit B2 can be charged, if the generated power voltage Vg fails to reach the voltage to be given to a control unit A1, which is necessary for the electric power conversion operation by the DC-DC converter A2, the control unit A1 cannot operate the DC-DC converter A2. Thus, although the electric power Eg with which the power storage unit B2 can be charged is generated, the charging cannot be performed on the power storage unit B2. This brings about a disadvantage that the generated electric power Eg becomes useless and thus the efficiency with which the charging can be performed is decreased that much.

In this respect, when the power storage system 1 (1A) according to the present first embodiment generates the first control voltage Vc1 and the second control voltage Vc2 that are given to the control unit 110, the electric power is supplied to the control unit 110 both from the input side 120a and the output side 120b of the DC-DC converter 120. That is, with respect to the electric power input unit 111 of the control power supply unit 112 including the constant voltage circuit such as the regulator, the rectification unit 130 is provided on the input side 120a (that is, the positive side of the electric power generation source 200) of the DC-DC converter 120 through the power lines LN5 and LN6, and the first switch 140 is provided on the output side 120b of the DC-DC converter 120 (that is, the positive side of the power storage unit 300) through the power lines LN7 and LN8. Specifically, in the electric power conversion apparatus 100 (100A), an anode of the diode 131 is connected to the input side (input node) 120a of the DC-DC converter 120, a cathode of the diode 131 is connected to the electric power input unit 111 of the control unit 110, and the first switch 140 is connected between the output side (output node) 120b of the DC-DC converter 120 and the electric power input unit 111 of the control unit 110.

Then, when the electric power generation source 200 starts generating electric power, the electric power Eg generated from the electric power generation source 200 is supplied from the positive side of the electric power generation source 200 through the rectification unit 130 to the electric power input unit 111 (control power supply node) of the control unit 110. In a state where the electric power necessary for operation (activation) of the control unit 110 is supplied from the electric power generation source 200, even if the generated power voltage Vg is an insufficient voltage (voltage lower than the first control voltage Vc1) to control an operation of the DC-DC converter 120 (that is, to drive the gate (G) of DC-DC converter 120), the sufficient second control voltage Vc2 to operate (to activate) only the control unit 110 is supplied to the control unit 110 (specifically, the second control voltage Vc2 is supplied from the control power supply unit 112 to the controller 113). Thus, the control unit 110 can operate. By doing this, in the state where the electric power Eg (equal to or higher than the electric power necessary for the electric power conversion operation by the DC-DC converter 120) with which the electric power generation source 200 can charge the power storage unit 300 is generated, even if the generated power voltage Vg fails to reach the first control voltage Vc1 necessary for the electric power conversion operation by the DC-DC converter 120, the control unit 110 controls an operation of the first switch 140 in such a manner as to turn ON the first switch 140, and thus causes the output side 120b (that is, the positive side of the power storage unit 300) of the DC-DC converter 120 and the electric power input unit 111 of the control unit 110 to conduct electricity. Thus, the stored power voltage Vc that is equal to or higher than the first control voltage Vc1 is supplied from the power storage unit 300 to the control unit 110.

Specifically, when the electric power with which the controller 113 (specifically, the microcomputer) can be operated (activated) and the second control voltage Vc2 lower than the first control voltage Vc1 is supplied, the control unit 110 causes the controller 113 to transmit an ON "HIGH" signal, as the first switch control signal, to the first switch 140 and to turn ON the first switch 140 and thus supplies the first control voltage Vc1, necessary for operations by an entire control system including all converting operations such as driving of the gate by the gate drive unit 114, from the power storage unit 300 on the output side 120b of the DC-DC converter 120 to the electric power input unit 111 of the control unit 110.

With such configuration, the power storage system 1 (1A) can operate the DC-DC converter 120 and therefore can charge the power storage unit 300 with the generated electric power Eg from the electric power generation source 200. This can reduce waste of the generated electric power Eg.

Figure 4:
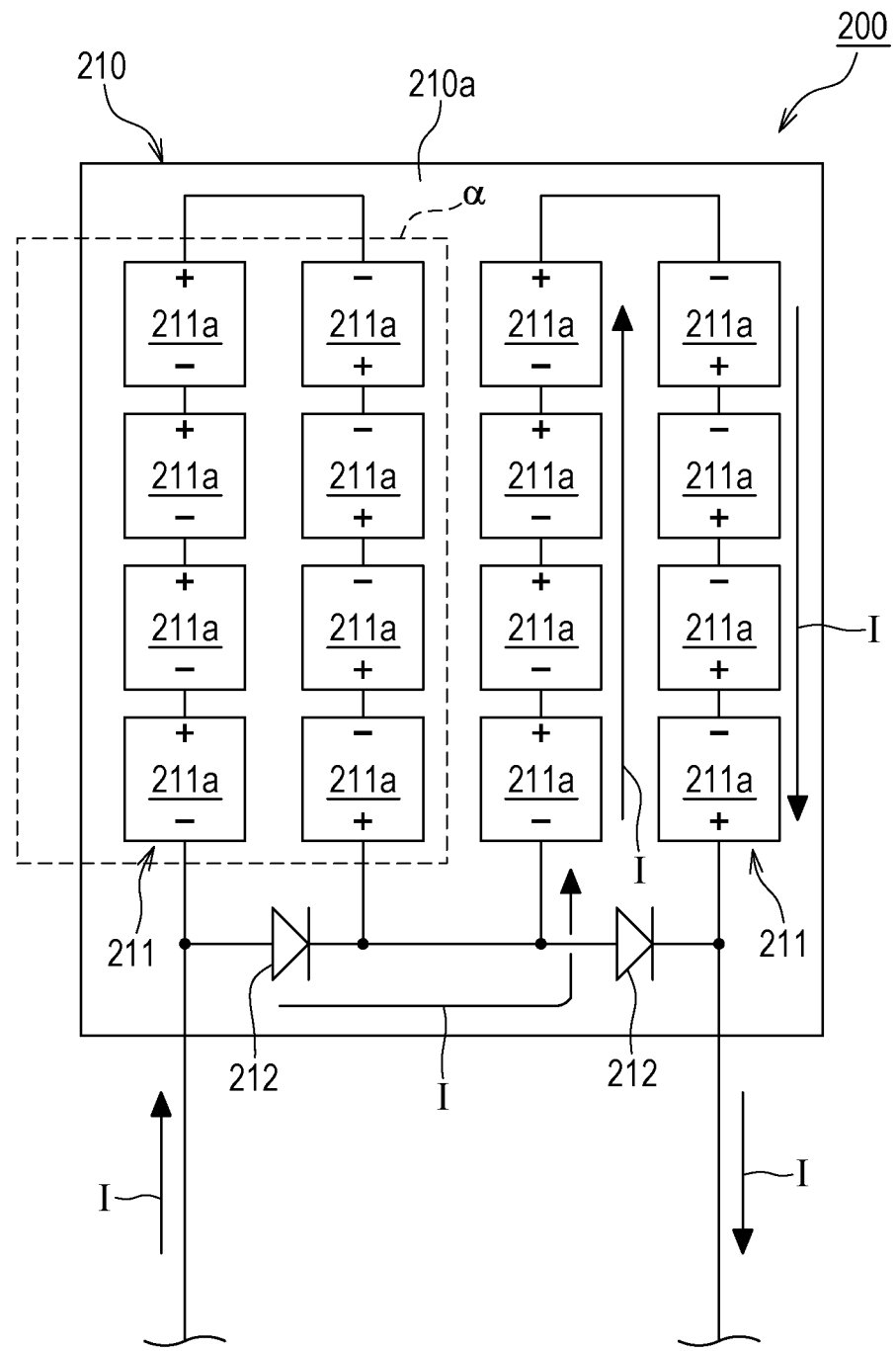
FIG. 4 is an outline plan view schematically illustrating an internal construction of a solar panel.

With regard to this, an example of the solar battery including a solar panel (a solar battery module) 210, as the electric power generation source 200 that performs electric power generation using natural energy, is further described referring to FIG. 4.

FIG. 4 is an outline plan view schematically illustrating an internal construction of the solar panel 210. In addition, a reference character I in FIG. 4 indicates generated electric current.

The solar panel 210 is not stable in terms of output and an output voltage changes also due to an amount of light exposure and temperature. Particularly, there is a concern that the output voltage may greatly decrease at a time when a part of light-receiving surface 210a is in shadow α.

That is, in the solar panel 210 as illustrated in FIG. 4, multiple cell columns 211 and 211 (two columns in this example) are provided. Each column includes multiple solar cells 211a to 211a (eight cells in this example) that are connected in series to one another. At both ends of each of the cell columns 211 and 211, multiple bypass diodes 212 and 212 (two diodes in this example) an anode of each of which is connected to a positive side of the cell column and a cathode of each of which is connected to a negative side of the cell column are provided. In this case, when light enters the entire surface of the light-receiving surface 210a, the output of cells (the number of cells is 16 in this example) in all the cell columns (two cell columns in this example) can be obtained. However, for example, if the left half of the light-receiving surface 210a is covered with fallen leaves or the like and is in shadow α, resulting in blocking light, only the right half thereof contributes to the output (the left half is bypassed by the bypass diode 212). In this case, only the output of the cells (eight cells in this example) in half of the cell columns (one cell column in this example) can be obtained. Besides, the voltage is further decreased by a decrease in voltage due to the operation of the bypass diode 212. In this case, since the right half of the light-receiving surface 210a receives sunlight and performs the electric power generation, the generated electric current is large, but since the number of in-series cells contributing to the output is small, the generated power voltage of the solar panel 210 is low. In the electric power storage system in the related art, the power storage unit cannot be charged with electric power generated in a large electric current with high efficiency at such low voltage.

However, in the power storage system 1 (1A) according to the present first embodiment, the charging can be performed on the power storage unit 300 with high efficiency even with the generated electric power at such low voltage.

Specifically, as illustrated in FIG. 4, only the cells (eight cells in this example) in half of the cell columns (one cell column in this example) are assumed to contribute to the output. In this case, the output of each cell is set at 0.6 V, and in addition to the bypass diode 212, the diode 131 (refer to FIG. 2) is passed in the rectification unit 130 in a path to the electric power input unit 111 of the control unit 110. A voltage decrease in each of the bypass diode 212 and the diode 131 is set as 0.5 V, the generated power voltage Vg that enters the electric power input unit 111 of the control unit 110 is "the output of each cell"בthe number of cells"–"the voltage decrease"בthe number of diodes" (0.6 V×8–0.5 V×2=3.8 V in this case).

At this point, if a power MOSFET (IRF3205: a gate threshold is a maximum of 4 V) manufactured by International Rectifier (IR) is used as the switching elements 121 (1211 and 1212) in the DC-DC converter 120, the above-described value is insufficient as the first control voltage Vc1 for the gate drive. Furthermore, if, for example, a gate driver IR2113 having an ampere-level gate drive electric current function, manufactured by IR, is used as the gate drive unit 114 in order to perform the gate switching at a high speed, a recommended supply voltage Vcc is 10 V or higher, and the gate drive operation cannot be operated at the above-described voltage that is considerably lower than 10 V.

However, generally, the above-described value is a sufficient value in terms of the voltage at which a general-purpose microcomputer is operated. If, for example, dsPIC 33F manufactured by Microchip Technology Inc. is used as the microcomputer of the controller 113, an operating voltage is 3.3 V and if, for example, L78/G14 manufactured by Renesas Electronics Corporation is used, the operating voltage is 1.6 V. This is a sufficient voltage in terms of the second control voltage Vc2 at which the CPU operates (is activated) in this manner, and enables the CPU to operate.

Therefore, when in a state where the electric power, at which the operation (activation) of the controller 113 (the CPU) is possible, is supplied from the input side 120a (that is, the positive side of the electric power generation source 200) of the DC-DC converter 120 to the electric power input unit 111 of the control unit 110, the second control voltage Vc2 for operating (activating) the controller 113 (the CPU) is given by the start of sunlight, the ON signal as the first switch control signal is transmitted to the first switch 140 and thus the voltage (the voltage equal to or higher than the first control voltage Vc1) sufficient for the gate drive is supplied from the output side 120b (that is, the positive side of the power storage unit 300) of the DC-DC converter 120 to the electric power input unit 111 of the control unit 110. Thus, the operation of the DC-DC converter 120 can be started.

If the electric power conversion apparatus 100 (100A) is set as a step-down DC-DC converter, the voltage during the electric power conversion operation is higher in the electric power input unit 111 of the control unit 110 and on the input side 120a (the positive side of the electric power generation source 200) of the DC-DC converter 120 than on the output side 120b (the positive side of the power storage unit 300) of the DC-DC converter 120. The rectification unit 130 allows the flow of electric current from the input side 120a of the DC-DC converter 120 to the electric power input unit 111 of the control unit 110 and further allows the flow of electric current from a node of the electric power input unit 111 through a built-in diode of the PMOS transistor SW1 of the first switch 140 to the output side 120b of DC-DC converter 120. Because of this, an electric current path occurs on which the power conversion is not performed in the DC-DC converter 120 along a path from the input side 120a of the DC-DC converter 120 through the electric power input unit 111 of the control unit 110 to the output side 120b of the DC-DC converter 120. This brings about a disadvantage of decreasing conversion efficiency.

The electric power conversion apparatus 100 (100A) according to the present first embodiment is set as the step-up DC-DC converter. When the generated electric power Eg of the electric power generation source 200 is decreased and, for example, a part of the solar panel 210 is in shadow α (refer to FIG. 4) and thus the generated power voltage Vg is decreased to a level lower than the stored power voltage Vc because the generated electric power Eg passes through the bypass diode 212, the electric power conversion apparatus 100 (100A) according to the present first embodiment has a voltage step up function and thus can step up the generated power voltage Vg and charge the power storage unit 300 with the stepped-up voltage. Then, the voltage during the electric power conversion operation is higher in the electric power input unit 111 of the control unit 110 and on the output side 120b (the positive side of the power storage unit 300) of the DC-DC converter 120 than on the input side 120a (that is, the positive side of the electric power generation source 200) of the DC-DC converter 120 and the rectification unit 130 disallows the flow of electric current between the input side 120a of the DC-DC converter 120 and the electric power input unit 111 of the control unit 110. Thus, the electric current does not flow directly from the input side 120a of the DC-DC converter 120 to the output side 120b of the DC-DC converter 120 along this path.

Furthermore, even though the electric power generation source 200 stops the electric power generation depending on a generation state (for example, sunlight is absent), the electric power of the power storage unit 300 can be used as the electric power necessary for the electric power conversion operation by the DC-DC converter 120 because an ON operation by the first switch 140 allows the flow of electric current from the output side 120b (that is, the positive side of the power storage unit 300) of the DC-DC converter 120 to the electric power input unit 111 of the control unit 110. Thus, even in the event of an abrupt power generation failure, the entire control system does not stop immediately. That is, since the controller can perform the uninterrupted operation, the controller 113 can surely stop the operation of the DC-DC converter (the chopper circuit) 120 by transmitting a drive stop signal as the gate drive signal to the DC-DC converter 120 (specifically, by transmitting a gate-OFF signal to the gate (G) of the DC-DC converter 120). Besides, as described above, by monitoring the voltage or the electric current, the controller 113 can ensure that the electric power conversion operation system stop without a problem. Specifically, if the high-efficiency voltage step up is performed by the synchronous rectification, when the operation is stopped in a state where a synchronous rectification transistor is not surely turned OFF, there is a likelihood that a great reverse electric current from the power storage unit 300 to the electric power generation source 200 may occur. However, according to the present first embodiment, since the entire control system does not stop immediately even in the event of the abrupt power generation failure, the drive stop signal (specifically, the gate-OFF signal) as the gate drive signal can be surely transmitted to the DC-DC converter 120. This makes it possible to provide the high-efficiency step-up DC-DC converter with high reliability as the electric power conversion apparatus 100 (100A).

The DC-DC converter 120 according to the present first embodiment may have a reporting unit (for example, a display unit), not illustrated, installed in it. Alternatively, an external reporting unit (for example, an external display unit) may be provided and the DC-DC converter 120 may have a function of communicating with the external reporting unit. By doing this, when a malfunction is detected during the electric power generation or during the processing that stops the electric power generation, the malfunction state can be reported to an operator (for example, displayed for the operator). Even when the electric power generation source 200 does not generate the electric power, or the electric power generation source 200 generates the electric power but generates only the electric power Eg that falls below the electric power necessary for the operation (for example, the display operation) of the reporting unit or the external reporting unit, the reporting unit or the external reporting unit can be operated by using the electric power of the power storage unit 300 in order to report the malfunction state to the operator (display the malfunction state for the operator).

In addition, it goes without saying that in a state where the electric power generation source 200 generates the electric power Eg (equal to or higher than the electric power necessary for the electric power conversion operation by the DC-DC converter 120) with which the power storage unit 300 can be charged, if the generated power voltage Vg reaches the first control voltage Vc1 necessary for the electric power conversion operation by the DC-DC converter 120, the control unit 110 makes it possible to charge the power storage unit 300 with the generated electric power Eg from the electric power generation source 200 regardless of turning ON or turning OFF the first switch 140.

Second Embodiment

Next, a detailed circuit configuration of an electric power conversion apparatus 100 according to a second embodiment, illustrated in FIG. 1, is described below referring to FIGS. 5 and 6.

Figure 5:
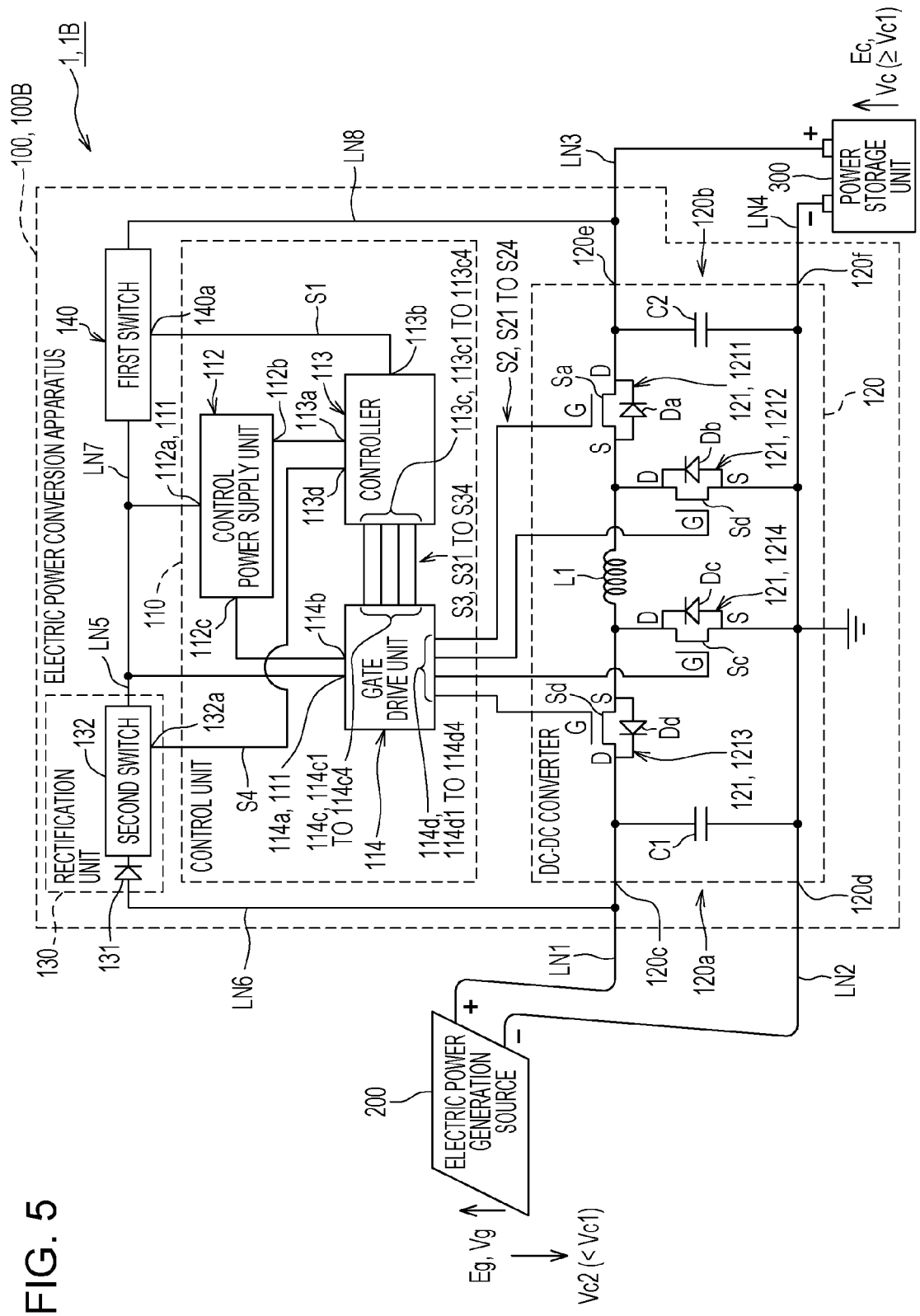
FIG. 5 is a circuit diagram schematically illustrating a detailed circuit configuration of an electric power conversion apparatus according to a second embodiment.

FIG. 5 is a circuit diagram schematically illustrating the detailed circuit configuration of the electric power conversion apparatus 100 (100B) according to the second embodiment.

The electric power conversion apparatus 100 (100A) according to the first embodiment, illustrated in FIG. 2, constitutes the step-up DC-DC converter, but the electric power conversion apparatus 100 (100B) according to the second embodiment, illustrated in FIG. 5, constitutes a step-up and step-down DC-DC converter.

The electric power conversion apparatus 100 (100B) according to the second embodiment, illustrated in FIG. 5, has the same configuration as the electric power conversion apparatus 100 (100A) according to the first embodiment, illustrated in FIG. 2, except that a second switch 132 is provided in a rectification unit 130, two switching elements 121 (1213 and 1214) are further provided in a DC-DC converter 120, and configurations regarding control of a controller 113 and control on gate drive of a gate drive unit 114 are changed.

The same elements of the electric power conversion apparatus 100 (100B) according to the second embodiment as those of the electric power conversion apparatus 100 (100A) according to the first embodiment are given like reference numerals, and here, the differences from the electric power conversion apparatus 100 (100A) according to the first embodiment are mainly described.

In the controller 113, gate control signal output units 113c (here, four gate control signal output units 113c1, 113c2, 113c3, and 113c4) of which the number depends on the number (here, 4) of the switching elements 121 in DC-DC converter 120 are connected to one ends of gate control signal lines S3 (S31, S32, S33, and S34), and the other ends are connected to gate control signal input units 114c (here, four gate control signal input units 114c1, 114c2, 114c3 and 114c4) of a gate drive unit 114. Through the gate control signal lines S3 (S31, S32, S33, and S34), a gate control signal (specifically, a gate PWM control signal) from the gate control signal output units 113c (113c1, 113c2, 113c3, and 113c4) is transmitted to the gate control signal input units 114c (114c, 114c2, 114c3, and 114c4) of the gate drive unit 114.

Then, a second control voltage Vc2 lower than a first control voltage Vc1 necessary for electric power conversion operation by the DC-DC converter 120 is supplied from a control power supply unit 112. Thus, the controller 113 can transmit the gate control signal from the gate control signal output units 113c (113c1, 113c2, 113c3, and 113c4) to the gate control signal input units 114c (114c1, 114c2, 114c3, and 114c4) of the gate drive unit 114 through the gate control signal lines S3 (S31, S32, S33, and S34).

The gate control signal input units 114c include the four gate control signal input units that result from adding the two gate control signal input units 114c3 and 114c4 to the two gate control signal input units 114c1 and 114c2. Gate drive signal output units 114d include four gate drive signal output units that result from adding two gate drive signal output units 114d3 and 114d4 to two gate drive signal output units 114d1 and 114d2.

One ends of the gate drive signal lines S2 (S21, S22, S23, and S24) are connected to the gate drive signal output units 114d (114d1, 114d2, 114d3, and 114d4) of which the number depends on the number (here, 4) of the switching elements 121 of the DC-DC converter 120 and the other ends are connected to the gate (G) of the switching elements 121 (1211, 1212, 1213, and 1214) of the DC-DC converter 120. The gate drive unit 114 transmits the gate drive signal from the gate drive signal output units 114d (114d1, 114d2, 114d3, and 114d4) to the gates (G) of the switching elements 121

(1211, 1212, 1213, and 1214) of the DC-DC converter 120 through the gate drive signal lines S2 (S21, S22, S23, and S24).

Then, when the first control voltage Vc1 necessary for the electric power conversion operation by the DC-DC converter 120 is supplied from a first gate-drive-unit power input unit 114a and a control power input unit 112a (the electric power input unit 111), the gate drive unit 114 transmits the gate drive signal from the gate drive signal output units 114d (114d1, 114d2, 114d3, and 114d4) to the gates (G) of the switching elements 121 (1211, 1212, 1213, and 1214) of the DC-DC converter 120 through the gate drive signal lines S2 (S21, S22, S23, and S24). By doing this, the gate drive unit 114 controls an operation of the DC-DC converter 120 and thus performs ON/OFF control. Consequently, the gate drive unit 114 can perform the power conversion control.

According to the present second embodiment, the DC-DC converter 120 constitutes the step-up and step-down DC-DC converter (specifically, a step-up and step-down chopper circuit) that steps up or steps down a voltage (a generated power voltage Vg) on an input side 120a into a voltage (a stored power voltage Vc) on an output side 120b and outputs the stepped-up or stepped-down voltage to the output side 120b. When a detection unit monitoring the generated power voltage Vg of an electric power generation source 200 and the stored power voltage Vc of a power storage unit 300 detects that the generated power voltage Vg of the electric power generation source 200 is lower than the stored power voltage Vc of the power storage unit 300, the control unit 110 steps up the generated power voltage Vg. On the other hand, when the detection unit detects that the generated power voltage Vg of the electric power generation source 200 is higher than the stored power voltage Vc of the power storage unit 300, the control unit 110 steps down the generated power voltage Vg.

The DC-DC converter 120 according to the present second embodiment includes the two switching elements 1213 and 1214 in addition to the two switching elements 1211 and 1212.

The additional two switching elements 1213 and 1214 are made from semiconductor switches Sc and Sd and diodes Dc and Dd, respectively. The semiconductor switches Sc and Sd are semiconductor devices in each of which ON/OFF control to enable electric current to flow only in one direction is possible. The diodes Dc and Dd are connected in parallel to the semiconductor switches Sc and Sd in such a manner that electric current is enabled to flow in the direction opposite to the direction in which the semiconductor switches Sc and Sd can enable the electric current to flow.

Among the additional two switching elements 1213 and 1214, a drain (D) of one switching element 1213 is connected to a power line LN1, and a source (S) thereof is connected to one end of an inductor L1. A drain (D) of the other switching element 1214 is connected to the source (S) of the one switching element 1213 and the one end of the inductor L1, and a source (S) thereof is connected to power lines LN2 and LN4 (ground).

Then, when the gate drive unit 114 receives the gate control signal (specifically a gate control PWM signal) from the controller 113, the gate control signal is transmitted from the gate drive unit 114 receiving the gate control signal to the gates (G). Operations of the switching elements 1211, 1212, 1213, and 1214 are controlled (specifically, are PWM-controlled) by this transmission of the gate control signal.

The rectification unit 130 includes the second switch 132 in addition to a diode 131. An output control system of the control unit 110 is connected to the second switch 132 through a second switch control signal line S4. The control unit 110 performs ON/OFF control on the second switch 132 by controlling an operation of the second switch 132.

The second switch 132 is connected in series with respect to the diode 131 between the electric power input unit 111 of the control unit 110 and one terminal 120c (that is, a positive side of an electric power generation source 200) on the input side 120a of the DC-DC converter 120.

Specifically, one end of the second switch 132 is connected to the control power input unit 112a of the control power supply unit 112 and the first gate-drive-unit power input unit 114a of the gate drive unit 114 through a power line LN5, and the other end is connected to a cathode of the diode 131.

Furthermore, an operation of the second switch 132 is controlled with the second switch control signal from the control unit 110 through the second switch control signal line S4. The second switch 132 is configured in such a manner that when the control unit 110 is not in operation, the second switch 132 is in an ON state.

One end of the second switch control signal line S4 is connected to a second switch control signal output unit 113d and the other end thereof is connected to a second switch control signal input unit 132a of the second switch 132. Specifically, the controller 113 transmits the second switch control signal from the second switch control signal output unit 113d to the second switch control signal input unit 132a of the second switch 132 through the second switch control signal line S4. Accordingly, the controller 113 transmits the second switch control signal from the second switch control signal output unit 113d to the second switch control signal input unit 132a of the second switch 132 through the second switch control signal line S4 and controls an operation of the second switch 132. Thus, the controller 113 can perform the ON/OFF control on the second switch 132.

In the electric power conversion apparatus 100 (100A) according to the first embodiment, illustrated in FIG. 2, the input side 120a of the DC-DC converter 120 and the electric power input unit 111 of the control unit 110 are connected to each other with the diode 131. However, in the electric power conversion apparatus 100 (100B) according to the present second embodiment, the second switch 132 that is controllable by the controller 113 is connected between the cathode of the diode 131 and the electric power input unit 111 of the control unit 110.

The second switch 132 may include whatever can be ON/OFF-controlled with the second switch control signal that is input into the second switch control signal input unit 132a and when the controller 113 is not in operation, is in the ON state. The second switch 132 herein is configured to be turned ON if the second switch control signal from the controller 113 is "LOW" and turned OFF if the second switch control signal is "HIGH" when a voltage is applied to the input side 120a of the DC-DC converter 120. Furthermore, the second switch 132 herein is assumed to be a combination of an NMOS transistor SW3 (refer to FIG. 6) and an NMOS transistor SW2 (refer to FIG. 6).

In addition, in the present second embodiment, the second switch 132 is configured in such a manner as not to have characteristics of the diode of which the anode is set as the input side 120a of the DC-DC converter 120 and of which the cathode is set as the electric power input unit 111 side of the control unit 110.

Figure 6:
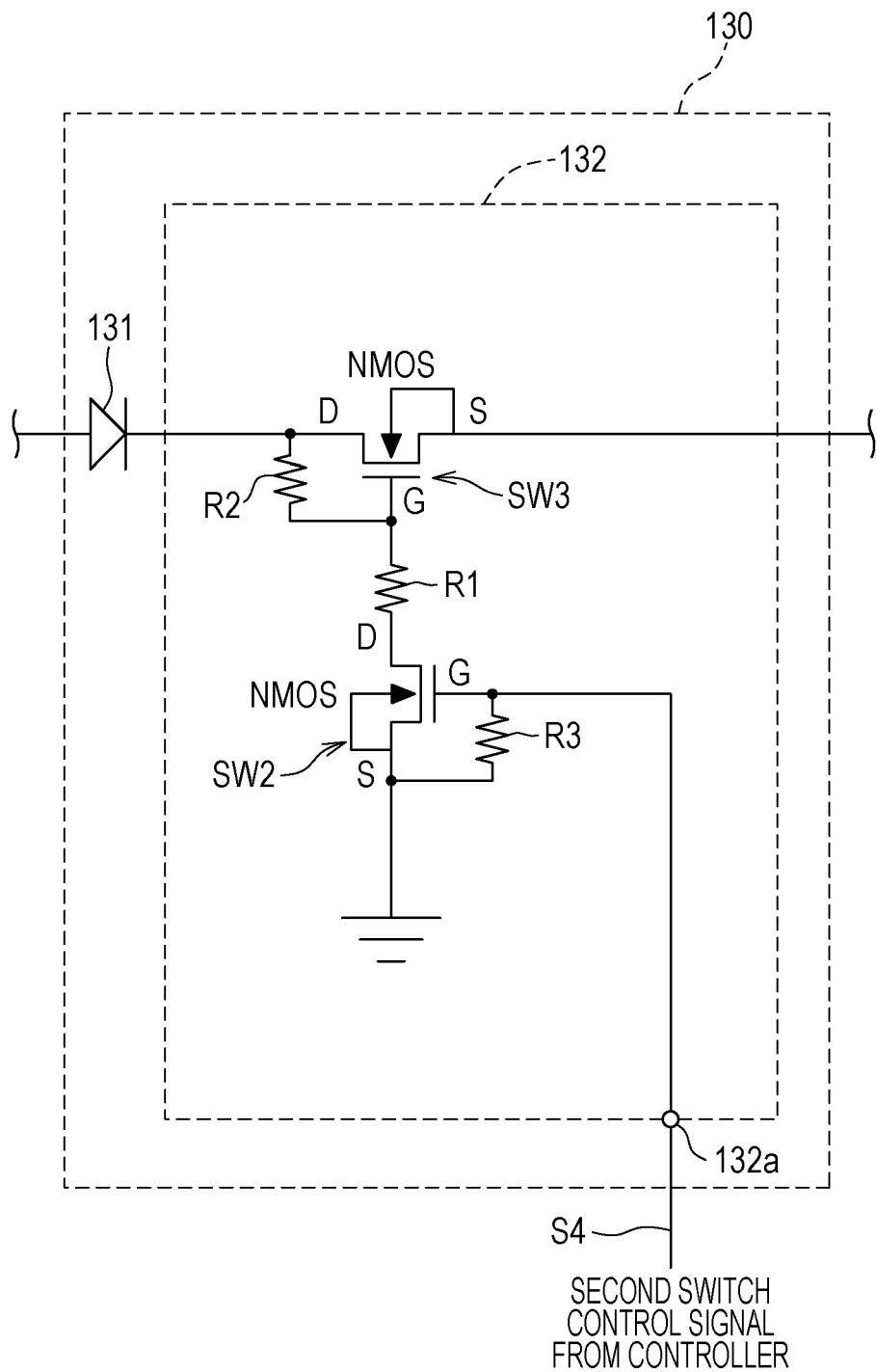
FIG. 6 is a circuit diagram illustrating details of a second switch in a rectification unit of the electric power conversion apparatus according to the second embodiment.

FIG. 6 is a circuit diagram illustrating details of the second switch 132 in the rectification unit 130 of the electric power conversion apparatus 100 (100B) according to the second embodiment.

As illustrated in FIG. 6, the second switch 132 is configured to include the NMOS transistor SW3 instead of the PMOS transistor SW1 in the first switch 140, which is illustrated in FIG. 3.

Specifically, unlike in the case of the PMOS transistor SW1 in the first switch 140, a source (S) of the NMOS transistor SW3 in the second switch 132 is connected to the electric power input unit 111 of the control unit 110 and a drain (D) of the NMOS transistor SW3 is connected to the input side 120a of the DC-DC converter 120, and a resistor R2 is connected between the drain (D) and a gate (G) of the NMOS transistor SW3. Furthermore, the gate (G) of the NMOS transistor SW2, which is connected to the second switch control signal input unit 132a, is connected to the second switch control signal output unit 113d of the controller 113 (refer to FIG. 5) through the second switch control signal line S4. With such configuration, the second switch control signal is transmitted from the second switch control signal output unit 113d of the controller 113 to the gate (G) of the NMOS transistor SW2 in the second switch 132, and thus the NMOS transistor SW2 is ON/OFF-controlled. By doing this, the NMOS transistor SW3 is ON/OFF-controlled and the second switch 132 is in the ON state at a time when the control unit 110 is not in operation. Specifically, in the second switch 132, when the second switch control signal "LOW" is given to the NMOS transistor SW2 and thus a gate threshold of the NMOS transistor SW3 is exceeded, the NMOS transistor SW3 conducts electricity. In contrast, when the second switch control signal "HIGH" is given to the NMOS transistor SW2, the NMOS transistor SW3 does not conduct electricity.

In a power storage system 1 (1B) according to the present second embodiment, when the electric power generation source 200 starts generating electric power, a generated electric power Eg from the electric power generation source 200 is supplied from a positive side of the electric power generation source 200 to the electric power input unit 111 (a control power supply node) of the control unit 110 through the diode 131 and the ON-state second switch 132 in the rectification unit 130.

In addition, a resistor for the control of electric current may be connected in series to the diode 131 and the NMOS transistor SW3, as necessary. By providing the resistor, elements of the second switch 132 and of the first switch 140 can be prevented from being damaged, because a flow of a large electric current from the electric power generation source 200 through the second switch 132 and the first switch 140 to the power storage unit 300 is suppressed even if the generated power voltage of the electric power generation source 200 is higher than the voltage of the power storage unit 300 at a time when the electric power generation source 200 starts generating the electric power.

When the electric power with which the controller 113 (specifically, a microcomputer) can be operated (activated) and the second control voltage Vc2 lower than the first control voltage Vc1 are supplied, the control unit 110 causes the controller 113 to transmit a "HIGH" signal, as the first switch control signal and the second switch control signal, to the first switch 140 and the second switch 132 and to turn ON the first switch 140 and turn OFF the second switch 132, respectively, and thus supplies the first control voltage Vc1 necessary for operations by an entire control system including all converting operations such as driving of the gate by the gate drive unit 114, from the power storage unit 300 on the output side 120b of the DC-DC converter 120 to the electric power input unit 111 of the control unit 110.

With such configuration, the DC-DC converter 120 can be operated and the power storage unit 300 can be charged with the generated electric power Eg from the electric power generation source 200. This makes it possible to reduce waste of the generated electric power Eg.

Furthermore, when the voltage (the generated power voltage Vg of the electric power generation source 200) on the input side 120a of the DC-DC converter 120 is lower than the voltage (the stored power voltage Vc of the power storage unit 300) on the output side 120b of the DC-DC converter 120, the controller 113 transmits the gate control signal to the gate drive unit 114 in order to perform a step-up operation. When the voltage on the input side 120a is higher than the voltage on the output side 120b, the controller 113 transmits the gate control signal to the gate drive unit 114 in order to perform a step-down operation. Thus, the gate drive unit 114 transmits the gate drive signal to the DC-DC converter 120 in order to drive the DC-DC converter 120. An operation of the DC-DC converter 120 can be controlled in this manner.

Then, regardless of whether the voltage on the output side 120b of the DC-DC converter 120 is higher or lower than the voltage on the input side 120a of the DC-DC converter 120, the flow of electric current is disallowed between the input side 120a of the DC-DC converter 120 and the output side 120b of the DC-DC converter 120 due to the diode 131 and the OFF-state second switch 132 in the rectification unit 130. This can make it possible to prevent the electric power that is not stepped up or stepped down from flowing to the output side 120b of the DC-DC converter 120 along a path from the input side 120a of the DC-DC converter 120 through the electric power input unit 111 of the control unit 110 to the output side 120b of the DC-DC converter 120. Thus, the high-efficiency step-up and step-down operation can be performed.

Besides, for example, when light enters the entire surface, the solar panel 210, as the electric power generation source 200, which outputs the generated power voltage Vg higher than the stored power voltage Vc can be used. Although at the same electric power, a high voltage and a small electric current cause less heat generation loss due to parasitic resistance. Thus, it is possible to perform the high-efficiency power conversion.

Other advantages are the same as those in the case of the power storage system 1 (1A) according to the first embodiment, and the description thereof is omitted here.

Example of Controlling the DC-DC Converter

Next, an example of controlling the DC-DC converters 120 according to the first and second embodiments is described below referring to FIG. 7.

The control unit 110 according to the first and second embodiments monitors the generated power voltage Vg and generated electric current I of the electric power generation source 200. Thus, when detecting that the generated electric power Eg falls below the electric power necessary for the electric power conversion operation by the DC-DC converter 120 while the DC-DC converter 120 is in operation, the control unit 110 causes the first switch 140 to be in the OFF state.

Figure 7:
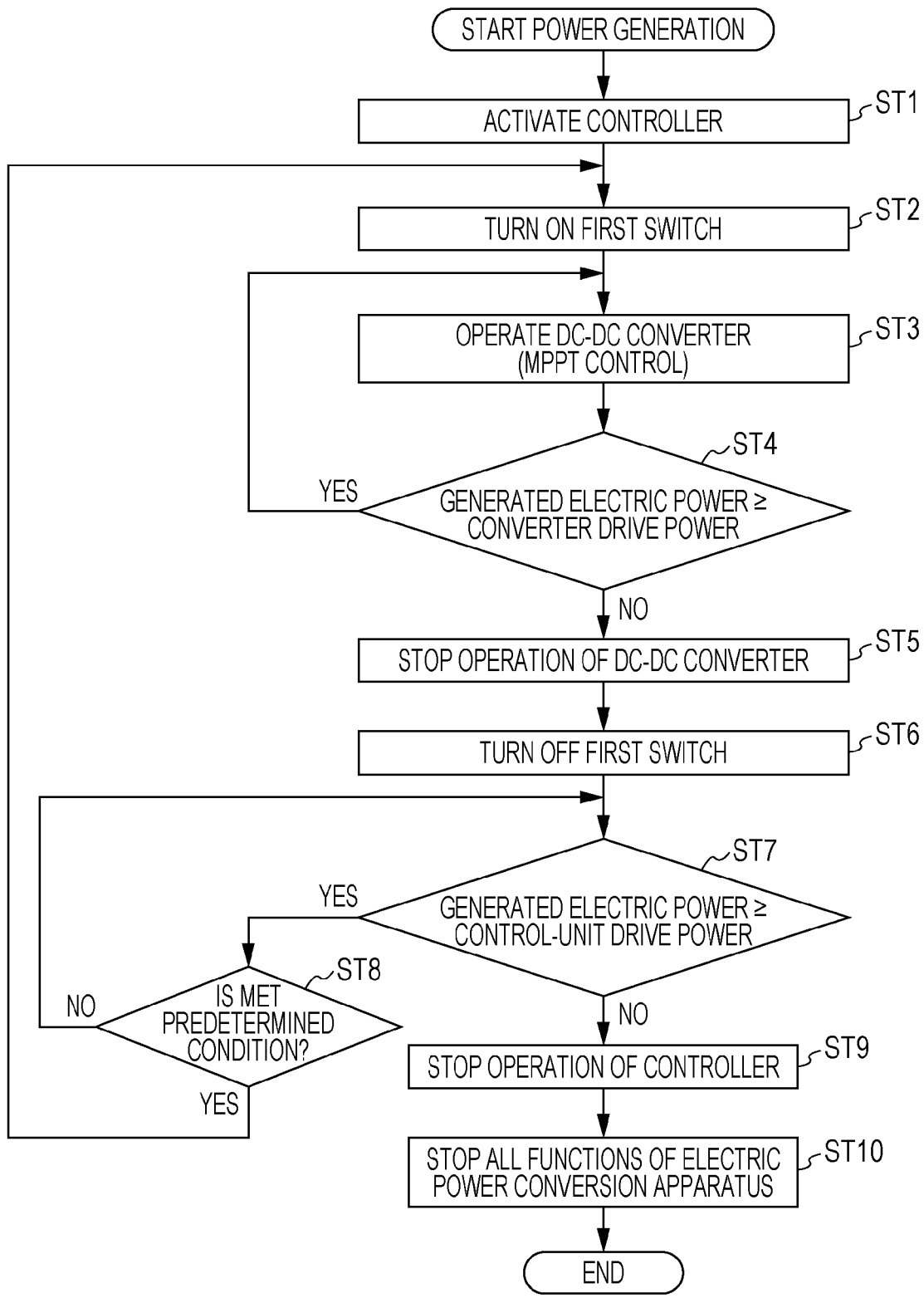
FIG. 7 is a flowchart illustrating a processing flow in an example of controlling a DC-DC converter according to the first and second embodiments.

FIG. 7 is a flowchart illustrating a processing flow in the example of controlling the DC-DC converter 120 according to the first and second embodiments.

As illustrated in FIG. 7, according to the first and second embodiments, when the electric power generation source 200 starts generating the electric power, the control unit 110 activates the controller 113 by supplying the second control voltage Vc2 necessary for the operation (activation) of the controller 113 (Step ST1). Then, the control unit 110 turns ON the first switch 140 (Step ST2) and starts operating the DC-DC converter 120 (here, to perform MPPT control on the DC-DC converter 120) (Step ST3).

Here, in the power storage systems 1 (1A and 1B), if the generated electric power Eg of the electric power generation source 200 is decreased depending on the generation state of the electric power generation source 200, for example, due to the solar panel 210 being partly in shadow α (refer to FIG. 4), but the electric power equal to or higher than the electric power (hereinafter referred to as a converter drive power) necessary for the electric power conversion operation by the DC-DC converter 120 is generated, although the generated electric power Eg is decreased, the charging can be performed on the power storage unit 300 by stepping up the generated power voltage Vg. However, for example, in a case where because the generated electric power Eg is further decreased, and thus the generated electric power Eg reaches an insufficient electric power level due to a small amount of exposure of the solar panel 210 to sunlight, the generated electric power Eg fails to reach the converter drive power, when the drive of the DC-DC converter 120 continues as it does, there is a concern that a stored electric power Ec of the power storage unit 300 may further be consumed.

Then, in this example, an operation of the DC-DC converter 120 is controlled by the processing in Step ST4 and onward.

That is, after starting the operation of the DC-DC converter 120 by turning on the first switch 140 at the start of the electric power generation (Steps ST1 to ST3), the controller 113 determines whether or not the generated electric power Eg reaches the converter drive power (Step ST4). If it is determined that the generated electric power Eg reaches the converter drive power (Step ST4: Yes), the processing proceeds to Step ST3, and the controller 113 continues the operation of the DC-DC converter 120. On the other hand, if it is determined that the generated electric power Eg fails to reach the converter drive power (Step ST4: No), the gate drive of the DC-DC converter 120 is stopped (Step ST5), and the first switch 140 is turned off (Step ST6). Accordingly, the stored electric power Ec of the power storage unit 300 can be effectively prevented from being consumed.

Then, it is determined in Step ST7 whether or not the generated electric power Eg reaches the electric power (hereinafter referred to as a control-unit drive electric power) necessary for the operation (activation) of the controller 113. If it is determined that the generated electric power Eg reaches the control-unit drive electric power (Step ST7: Yes), a predetermined condition, for example, the generated power voltage Vg of the electric power generation source 200 is monitored, and it is determined whether or not a condition that the generated power voltage Vg is increased or a condition that a time predetermined by a timer operation elapses is met (Step ST8).

If the predetermined condition is met in Step ST8 (Step ST8: Yes), the processing proceeds to Step ST2 to turn on the first switch 140 and operate the DC-DC converter 120 (Step ST3). If the generated electric power Eg is sufficient (is the electric power equal to or higher than the converter drive power) as a result of checking the generated electric power Eg (Step ST4: Yes), the processing proceeds to Step ST3 to continue the operation of the DC-DC converter 120. If the generated electric power Eg is insufficient (lower than the converter drive power) (Step ST4: No), the operation of the DC-DC converter 120 is stopped (Step ST5), and the first switch 140 is turned off (Step ST6). A sequence of these operations repeats.

On the one hand, if the predetermined condition is not met in Step ST8 (Step ST8: No), the processing proceeds to Step ST7.

In Step ST7, if the generated electric power Eg is decreased, and the generated electric power Eg falls short of the control-unit drive electric power (Step ST7: No), the operation of the controller 113 is stopped (Step ST9) and all functions of the electric power conversion apparatuses 100 (100A and 100B) are stopped (Step ST10). Thus, the electric power generation is ended.

In the power storage systems 1 (1A and 1B) with this configuration according to the first and second embodiments, when the generated electric power Eg of the electric power generation source 200 is sufficient, even if the generated power voltage Vg of the electric power generation source 200 is low, the charging is performed on the power storage unit 300 by activating the DC-DC converter 120. Also, when detecting that the generated electric power Eg falls below the electric power necessary for the electric power conversion operation by DC-DC converter 120 while DC-DC converter 120 is in operation, the control unit 110 causes the first switch 140 to be in the OFF state. Thus, when the electric power generation source 200 does not generate the electric power or when the electric power generation source 200 generates the electric power but generates only the generated electric power Eg that falls below the electric power necessary for the electric power conversion operation by the DC-DC converter 120, the consumption of the stored electric power Ec of the power storage unit 300 can be suppressed.

That is, while the consumption of the stored electric power Ec of the power storage unit 300 is suppressed as much as possible, the charging can be performed on the power storage unit 300 although the generated power voltage Vg of the electric power generation source 200 is low, when the generated electric power Eg of the electric power generation source 200 is sufficient.

Specifically, in the power storage systems 1 (1A and 1B), when the electric power generation source 200 starts generating the electric power (for example, when the exposure to sunlight is possible and thus the solar panel 210 starts generating the electric power), even if the generated power voltage Vg is insufficient as the first control voltage necessary for the electric power conversion operation by the DC-DC converter 120 (for example, even in a case where one part of the solar panel 210 is in shadow α, and thus only the low generated power voltage Vg is output, but the second control voltage Vc2 sufficient to operate (activate) only the control unit 110 is output), the drive of the DC-DC converter 120 can be started, and charging can be performed on the power storage unit 300. Also, if after the stop of the electric power generation, the controller 113 finds out that the DC-DC converter 120 is stopped without a problem, the controller 113 transmits the OFF signal as the first switch control signal to the first switch 140 and disallows the flow of electricity between the output side 120b (that is, the positive side of the power storage unit 300) of the DC-DC converter 120 and the electric power input unit 111 of the control unit 110. Accordingly, when the electric power generation source 200 does not generate the electric power, or when the electric power generation source 200 generates the electric power but generates only the electric power Eg that falls below the electric power necessary for the electric power conversion operation by the DC-DC converter 120 (for example, when the solar panel 210 does not generate the electric power), an occurrence of a so-called standby electric power can be reduced to substantially zero (specifically, an extremely small loss, such as a leakage electric current in the switching element 121 that is the PMOS transistor SW1 or a synchronous rectification MOS) and the consumption of the stored electric power Ec of the power storage unit 300 can be effectively prevented.

Furthermore, if the generated electric power Eg of the electric power generation source 200 is sufficient to activate the controller 113, the state monitoring is performed on the DC-DC converter 120 without using the stored electric power Ec of the power storage unit 300. If the generated electric power Eg of the electric power generation source 200 is decreased and, for example, the controller 113 cannot be activated and the controller 113 has to be stopped as it is, the controller 113 can be stopped without a problem. In other words, when stopping the controller 113, the DC-DC converter 120 is in a stopped state, and the gate (G) of the switching element 121 is surely turned off. Accordingly, regardless of the stop of the controller 113 due to the decrease in generated electric power Eg of the electric power generation source 200, the operation of the electric power conversion apparatuses 100 (100A and 100B) can be ended without a problem.

That is, even if the electric power generation by the electric power generation source 200 is abruptly stopped, the electric power is supplied from the output side 120b of the DC-DC converter 120 to the electric power input unit 111 of the control unit 110. Thus, while continuously monitoring the state of the DC-DC converter 120, the control system of the controller 113 can perform the operation of stopping the DC-DC converter 120 without a problem. Moreover, it is possible to cause a peripheral function to operate, for example, by notifying other apparatuses of the stopping of the electric power generation. Thereafter, the OFF signal as the first switch control signal is transmitted to the first switch 140, and the flow of electric current is disallowed from the output side 120b of the DC-DC converter 120 to the electric power input unit 111 of the control unit 110. This can stop the control system of the controller 113. Accordingly, it is possible to effectively prevent the consumption of the stored electricity power Ec of the power storage unit 300.

What is claimed is:

1. An electric power conversion apparatus for charging a power storage unit with a generated electric power received from an electric power generation source, comprising:
   a control unit that includes an electric power input unit into which an electric power is input;
   a DC-DC converter of which an input side is connected to the electric power generation source and of which an output side is connected to the power storage unit, an operation of the DC-DC converter being controlled by the control unit;
   a rectification unit that is connected between the electric power input unit of the control unit and the input side of the DC-DC converter, allows a flow of electric current from the input side of the DC-DC converter to the electric power input unit of the control unit, and disallows the flow of electric current from the electric power input unit of the control unit to the input side of the DC-DC converter; and
   a first switch that is connected between the electric power input unit of the control unit and the output side of the DC-DC converter, an operation of the first switch being controlled by the control unit,
   wherein the power storage unit is configured to have a stored power voltage equal to or higher than a first control voltage to be given to the control unit, the first control voltage being necessary for electric power conversion operation by the DC-DC converter, and
   wherein the control unit is configured to start operating and control the operation of the first switch, when a generated power voltage of the electric power generation source reaches a second control voltage lower than the first control voltage.

2. The electric power conversion apparatus according to claim 1,
   wherein when the generated power voltage reaches the second control voltage, the control unit causes the first switch to be in an ON state and allows the flow of electric current between the electric power input unit of the control unit and the output side of the DC-DC converter.

3. The electric power conversion apparatus according to claim 1,
   wherein when it is detected that the generated electric power falls below an electric power necessary for the electric power conversion operation by the DC-DC converter while the DC-DC converter is in operation, the control unit causes the first switch to be in an OFF state.

4. The electric power conversion apparatus according to claim 2,
   wherein when it is detected that the generated electric power falls below an electric power necessary for the electric power conversion operation by the DC-DC converter while the DC-DC converter is in operation, the control unit causes the first switch to be in an OFF state.

5. The electric power conversion apparatus according to claim 1,
   wherein the DC-DC converter is a step-up DC-DC converter that is configured to step up a voltage on the input side of the DC-DC converter, and
   wherein when it is detected that the generated power voltage of the electric power generation source is lower than the stored power voltage of the power storage unit, the control unit steps up the generated power voltage.

6. The electric power conversion apparatus according to claim 2,
   wherein the DC-DC converter is a step-up DC-DC converter that is configured to step up a voltage on the input side of the DC-DC converter, and
   wherein when it is detected that the generated power voltage of the electric power generation source is lower than the stored power voltage of the power storage unit, the control unit steps up the generated power voltage.

7. The electric power conversion apparatus according to claim 3,
   wherein the DC-DC converter is a step-up DC-DC converter that is configured to step up a voltage on the input side of the DC-DC converter, and
   wherein when it is detected that the generated power voltage of the electric power generation source is lower than the stored power voltage of the power storage unit, the control unit steps up the generated power voltage.

8. The electric power conversion apparatus according to claim 4,
   wherein the DC-DC converter is a step-up DC-DC converter that is configured to step up a voltage on the input side of the DC-DC converter, and
   wherein when it is detected that the generated power voltage of the electric power generation source is lower than the stored power voltage of the power storage unit, the control unit steps up the generated power voltage.

9. The electric power conversion apparatus according to claim 1,
   wherein the DC-DC converter is a step-up and step-down DC-DC converter that is configured to step up and step down a voltage on the input side of the DC-DC converter, and wherein when it is detected that the generated power voltage of the electric power generation source is lower than the stored power voltage of the power storage unit, the control unit steps up the generated power voltage, and when it is detected that the generated power voltage of the electric power generation source is higher than the stored power voltage of the power storage unit, the control unit steps down the generated power voltage.

10. The electric power conversion apparatus according to claim 2,
wherein the DC-DC converter is a step-up and step-down DC-DC converter that is configured to step up and step down a voltage on the input side of the DC-DC converter, and
wherein when it is detected that the generated power voltage of the electric power generation source is lower than the stored power voltage of the power storage unit, the control unit steps up the generated power voltage, and when it is detected that the generated power voltage of the electric power generation source is higher than the stored power voltage of the power storage unit, the control unit steps down the generated power voltage.

11. The electric power conversion apparatus according to claim 3,
wherein the DC-DC converter is a step-up and step-down DC-DC converter that is configured to step up and step down a voltage on the input side of the DC-DC converter, and
wherein when it is detected that the generated power voltage of the electric power generation source is lower than the stored power voltage of the power storage unit, the control unit steps up the generated power voltage, and when it is detected that the generated power voltage of the electric power generation source is higher than the stored power voltage of the power storage unit, the control unit steps down the generated power voltage.

12. The electric power conversion apparatus according to claim 4,
wherein the DC-DC converter is a step-up and step-down DC-DC converter that is configured to step up and step down a voltage on the input side of the DC-DC converter, and
wherein when it is detected that the generated power voltage of the electric power generation source is lower than the stored power voltage of the power storage unit, the control unit steps up the generated power voltage, and when it is detected that the generated power voltage of the electric power generation source is higher than the stored power voltage of the power storage unit, the control unit steps down the generated power voltage.

13. The electric power conversion apparatus according to claim 1,
wherein the rectification unit includes a rectification element.

14. The electric power conversion apparatus according to claim 2,
wherein the rectification unit includes a rectification element.

15. The electric power conversion apparatus according to claim 13,
wherein the rectification unit further includes a second switch that is connected in series to the rectification element, an operation of the second switch being controlled by the control unit and the second switch being in an ON state when the control unit is not in operation.

16. The electric power conversion apparatus according to claim 14,
wherein the rectification unit further includes a second switch that is connected in series to the rectification element, an operation of the second switch being controlled by the control unit and the second switch being in an ON state when the control unit is not in operation.

17. A power storage system comprising:
the electric power conversion apparatus according to claim 1; the electric power generation source; and the power storage unit.

18. A power storage system comprising:
the electric power conversion apparatus according to claim 2; the electric power generation source; and the power storage unit.

19. A power storage system comprising:
the electric power conversion apparatus according to claim 3; the electric power generation source; and the power storage unit.

20. A power storage method of charging a power storage unit with a generated electric power received from an electric power generation source, for an electric power conversion apparatus that
controls an operation of a DC-DC converter of which an input side is connected to the electric power generation source and of which an output side is connected to the power storage unit, using a control unit including an electric power input unit into which an electric power is input,
allows a flow of electric current from the input side of the DC-DC converter to the electric power input unit of the control unit and disallows the flow of electric current from the electric power input unit of the control unit to the input side of the DC-DC converter, using a rectification unit that is connected between the electric power input unit of the control unit and the input side of the DC-DC converter, and
controls an operation of a first switch using the control unit, the first switch being connected between the electric power input unit of the control unit and an output side of the DC-DC converter,
the power storage method comprising
when a generated power voltage of the electric power generation source reaches a second control voltage lower than a first control voltage to be given to the control unit, the first control voltage being necessary for electric power conversion operation by the DC-DC converter, supplying a stored power voltage to the control unit from the power storage unit having the stored power voltage equal to or higher than the first control voltage, by operating the control unit and controlling the operation of the first switch.

* * * * *